(12) United States Patent
Chen et al.

(10) Patent No.: US 12,736,717 B2
(45) Date of Patent: Sep. 15, 2026

(54) DEVICE AND A METHOD OF MANUFACTURING A DEVICE, SUCH AS A LIQUID LENS, WITH BOND CONFIGURED TO FRACTURE AT THE SAME BURST PRESSURE

(71) Applicant: CORNING INCORPORATED, Corning, NY (US)

(72) Inventors: Naigeng Chen, San Jose, CA (US); Stephan Lvovich Logunov, Corning, NY (US); Weiwei Luo, Painted Post, NY (US); Mark Alejandro Quesada, Horseheads, NY (US); Bo Yang, Dublin, CA (US)

(73) Assignee: CORNING INCORPORATED, Corning, NY (US)

( * ) Notice: Subject to any disclaimer, the term of this patent is extended or adjusted under 35 U.S.C. 154(b) by 538 days.

(21) Appl. No.: 18/033,152

(22) PCT Filed: Oct. 7, 2021

(86) PCT No.: PCT/US2021/053892

§ 371 (c)(1),
(2) Date: Apr. 21, 2023

(87) PCT Pub. No.: WO2022/086712

PCT Pub. Date: Apr. 28, 2022

(65) Prior Publication Data

US 2023/0393310 A1 Dec. 7, 2023

Related U.S. Application Data

(60) Provisional application No. 63/104,753, filed on Oct. 23, 2020.

(51) Int. Cl.

| | |
|---|---|
| ***G02B 3/14*** | (2006.01) |
| ***B23K 26/324*** | (2014.01) |

(Continued)

(52) U.S. Cl.
CPC .............. *G02B 3/14* (2013.01); *B23K 26/324* (2013.01); *B23K 26/57* (2015.10); *B23K 31/12* (2013.01);

(Continued)

(58) Field of Classification Search
CPC ............... G02B 3/14; G02B 3/12; G02B 1/06

(Continued)

(56) References Cited

U.S. PATENT DOCUMENTS

| | | | | |
|---|---|---|---|---|
| 2010/0020407 A1* | 1/2010 | Takai | ....................... | G02B 3/14 359/666 |
| 2010/0277923 A1* | 11/2010 | Takai | ....................... | G02B 3/14 359/666 |

(Continued)

FOREIGN PATENT DOCUMENTS

| | | |
|---|---|---|
| CN | 102738407 A | 10/2012 |
| CN | 105377783 A | 3/2016 |

(Continued)

OTHER PUBLICATIONS

International Search Report and Written Opinion of the International Searching Authority; PCT/US2021/053892; dated Jan. 24, 2022; 14 pages; European Patent Office.

(Continued)

*Primary Examiner* — William R Alexander
*Assistant Examiner* — Mackenzi Bourquine
(74) *Attorney, Agent, or Firm* — Kevin M. Able

(57) ABSTRACT

A device comprising: a first substrate; and a second substrate bonded to the first substrate via an innermost bond, an outermost bond, and bonds between the innermost bond and the outermost bond, the second substrate comprising a through-hole and an axis extending through the through-hole. Each of the bonds has a strength, and the strength of the bonds increases sequentially from the innermost bond to (Continued)

the outermost bond. The strength of each bond is sufficiently low such that the bonds fail in response to liquid (within a cavity defined by the first substrate, a third substrate, and the through-hole of the second substrate) exerting pressure on the first substrate instead of the first substrate failing. Each of the bonds are configured to fail at approximately the same pressure exerted upon the first substrate by the liquid. Additionally disclosed is a method of manufacturing the device.

7 Claims, 18 Drawing Sheets

(51) Int. Cl.
*B23K 26/57* (2014.01)
*B23K 31/12* (2006.01)
*B23K 103/00* (2006.01)
*G02B 26/00* (2006.01)

(52) U.S. Cl.
CPC ........ *G02B 26/005* (2013.01); *B23K 2103/54* (2018.08)

(58) Field of Classification Search
USPC .................................................. 359/665, 333
See application file for complete search history.

(56) References Cited

U.S. PATENT DOCUMENTS

2012/0161305 A1 6/2012 Ruben et al.
2012/0248950 A1 10/2012 Niibori
2017/0315274 A1* 11/2017 Park .................... G02B 27/646
2020/0004104 A1 1/2020 Park
2021/0086294 A1 3/2021 Fiaz et al.
2021/0191001 A1 6/2021 Bellman
2022/0173068 A1 6/2022 Zinner et al.

FOREIGN PATENT DOCUMENTS

CN 110168711 A 8/2019
CN 110226117 A 9/2019
CN 110515194 A 11/2019
EP 0261972 A2 3/1988
EP 1801622 A1 * 6/2007 .............. G02B 3/14
TW 201945111 A 12/2019
WO 2012/087369 A1 6/2012
WO 2014/182776 A1 11/2014
WO 2019/165269 A1 8/2019
WO 2019/226439 A1 11/2019

OTHER PUBLICATIONS

Chinese Patent Application No. 202180087434.8, Office Action dated Nov. 29, 2025, 5 pages (English Translation only), Chinese Patent Office.

* cited by examiner

DEVICE AND A METHOD OF MANUFACTURING A DEVICE, SUCH AS A LIQUID LENS, WITH BOND CONFIGURED TO FRACTURE AT THE SAME BURST PRESSURE

CROSS-REFERENCE TO RELATED APPLICATIONS

This application claims the benefit of priority under 35 U.S.C. § 371 of International Application No. PCT/US2021/053892, filed on Oct. 7, 2021, which claims the benefit of priority under 35 U.S.C. § 119 of U.S. Provisional Application No. 63/104,753, filed Oct. 23, 2020, the content of each of which is incorporated herein by reference in its entirety.

BACKGROUND

In some instances, a liquid lens includes layered substrates, with a first (top) substrate disposed on a second (center) substrate, which includes a through-hole and is disposed on a third (bottom) substrate. The first and third substrates sandwich the second substrate forming a cavity bounded by the through-hole, and two different liquids within the cavity. In some instances, the liquid lens includes two different liquids that are generally immiscible and thus form a meniscus between the two liquids. The meniscus can operate as a lens that manipulates electromagnetic radiation (such as visible light or infrared radiation) passing through the meniscus. The meniscus contacts the through-hole of the second substrate at an angle relative to the through-hole. Altering the angle at which the meniscus contacts the through-hole changes the shape or position of the meniscus, or both, and thus changes how the meniscus manipulates the electromagnetic radiation passing through. Subjecting the liquids to an electric field can so alter the angle at which the meniscus contacts the through-hole and is referred to as electro-wetting.

The layered substrates of the liquid lens are hermetically sealed so that the liquids do not escape. In other words, the first substrate and the second substrate are bonded together, and the second substrate and the third substrate are bonded together. In some instances, a laser is utilized to impart heat at the interface between the substrates, which, upon cooling, forms a strong inorganic bond between the substrates. The heat imparted is highly localized and dissipates quickly, thus not degrading the liquids, which can be thermally sensitive. In some instances, the laser forms concentric bonds centered around the through-hole. For example, the laser may form as many concentric bonds as possible within the allotted space. The concentric bonds are closed-loop to provide the hermetic seal. More than one concentric bond is utilized to create redundancy in case any given concentric bond has a defect that may otherwise prevent a hermetic seal. The process of forming such bonds via laser is sometimes referred to as "laser assisted welding."

The liquid lens finds application in, among other things, electronic devices, such as tablets and smart phones. In some instances, the liquids within the cavity of the liquid lens exert pressure upon the first substrate, the third substrate, or both. For example, an increase in the temperature of the liquids can cause the liquids to expand. As another example, if the electronic device is dropped and hits a surface, then the resulting jolt can cause the liquids to exert pressure upon the substrates. An electronic device manufacturer sometimes specifies the burst pressure of the liquid lens. The burst pressure can represent the minimum internal pressure (e.g., exerted by the liquids) at which the first substrate and/or bonds between the first substrate and the second substrate should be expected to fail. In other words, the first substrate and/or bonds should not fail in response to internal pressure exerted by the liquids below the burst pressure.

However, there is a problem in that the properties of the bonds can be such that the liquids either (i) cause the first substrate to break at an interior bond line, or (ii) cause all the concentric bonds between the first substrate and the second substrate to break in rapid sequence in the same event. In either instance, the liquid lens is rendered inoperable. These problems extend to devices, beyond liquid lenses, that include liquid disposed between bonded substrates (e.g., hermetically sealed devices).

SUMMARY

The present disclosure solves that problem with bonds formed via laser concentrically around an axis, each of which have a different bond strength, and the bond strengths of the bonds increase sequentially as a function of distance from the axis. In other words, the bond strengths of the bonds increase moving outward from the axis. The bond strengths are configured so that an increase in pressure from the liquid within the cavity of the device (such as a liquid lens) causes the bonds to burst instead of the first substrate. In addition, the strength and radius of each bond cooperate so that all of the bonds fail at the same or approximately the same pressure.

According to a first aspect of the present disclosure, a device comprises: a first substrate; and a second substrate bonded to the first substrate via a plurality of bonds comprising an innermost bond, an outermost bond, and at least one intermediate bond between the innermost bond and the outermost bond; wherein strengths of the bonds increase sequentially from the innermost bond to the outermost bond.

According to a second aspect, the first aspect, wherein: each bond comprises a different effective fracture toughness ($K_{IC}$); the innermost bond comprises the smallest effective fracture toughness ($K_{IC}$); the outermost bond comprises the largest effective fracture toughness ($K_{IC}$); and the effective fracture toughness ($K_{IC}$) of each bond of the at least one intermediate bond increases toward the outermost bond.

According to a third aspect, the device of any one of the first through second aspects further comprises: a third substrate bonded to the second substrate opposite the first substrate; a cavity defined by the first substrate, the third substrate, and a through-hole of the second substrate; and a liquid disposed within the cavity; wherein, the strength of each bond is sufficiently low that the bonds fail in response to the liquid exerting pressure on the first substrate instead of the first substrate.

According to a fourth aspect, the device of any one of the first through second aspects further comprises: a third substrate bonded to the second substrate opposite the first substrate; a cavity defined by the first substrate, the third substrate, and a through-hole of the second substrate; and a liquid disposed within the cavity; wherein, each of the bonds is configured to fail at approximately the same pressure exerted upon the first substrate by the liquid.

According to a fifth aspect, any one of the third through fourth aspects, wherein: each bond comprises a radius; and the radii and the strengths of the bonds are cooperatively configured such that each bond fails at approximately the same pressure exerted upon the first substrate by the liquid.

According to a sixth aspect, any one of the third through fifth aspects, wherein the pressure at which the bonds fail is 1 MPa to 3 MPa.

According to a seventh aspect, any one of the first through sixth aspects, wherein each of the first substrate and the second substrate comprises a coefficient of thermal expansion greater than 5 ppm/° C. from 20° C. to 300° C.

According to an eighth aspect, any one of the first through seventh aspects, wherein: each bond comprises a width, and the widths of all the bonds are at least approximately equal; adjacent bonds are separated by a spacing, and the spacings between all adjacent bonds are at least approximately equal; and a ratio of the spacing to the width is 1 to 5.

According to a ninth aspect, any one of the first through eighth aspects, wherein the device is a liquid lens.

According to a tenth aspect, a device comprises: a first substrate; a second substrate bonded to the first substrate via a plurality of bonds comprising an innermost bond, an outermost bond, and at least one intermediate bond between the innermost bond and the outermost bond, the second substrate comprising a through-hole; a third substrate bonded to the second substrate opposite the first substrate; a cavity defined by the first substrate, the third substrate, and the through-hole of the second substrate; and a liquid disposed within the cavity; wherein each of the bonds is configured to fail at approximately the same pressure exerted upon the first substrate by the liquid.

According to an eleventh aspect, the tenth aspect, wherein strengths of the bonds increase sequentially from the innermost bond to the outermost bond; and radii and the strengths of the bonds are cooperatively configured such that each bond fails at approximately the same pressure exerted upon the first substrate by the liquid.

According to a twelfth aspect, any one of the tenth through eleventh aspects, wherein: each bond has approximately the same width; each pair of adjacent bonds is separated by approximately the same spacing; and a ratio of the spacing to the width is 1 to 5.

According to a thirteenth aspect of the present disclosure, a method of manufacturing a device comprises: assigning a minimum burst pressure; determining a range of incident laser energy densities ranging from a minimum incident laser energy density sufficient to form a bond between a first substrate and a second substrate to a maximum incident laser energy density that forms a bond between the first substrate and the second substrate that is weaker than the first substrate; determining a range of bond strengths ranging from a minimum bond strength formed using the minimum incident laser energy density to a maximum bond strength formed using the maximum incident laser energy density; determining a range of bond radii as a function of the assigned minimum burst pressure and the determined range of bond strengths from a minimum radius of an innermost bond to a maximum radius of an outermost bond; determining a number of bonds, each bond having an equal width, and equal spacing between adjacent bonds so that a ratio of the spacing to the width is 1 to 5; determining the radius for each of the at least one intermediate bond between the innermost bond and the outermost bond as a function of the determined number of bonds and spacing between adjacent bonds; determining the strength of each intermediate bond as a function of the determined radius for each intermediate bond; determining the incident laser energy density, within the range of incident laser energy densities, corresponding to each intermediate bond as a function of the determined strength; and forming the innermost bond at the minimum radius using the minimum incident laser energy density, the outermost bond at the maximum radius using the maximum incident laser energy density, and each intermediate bond at the determined radius using the determined incident laser energy density.

According to a 14th aspect comma the 13th aspect, wherein: (a) determining the range of incident laser energy densities ranging from the minimum incident laser energy density sufficient to form the bond between the first substrate and the second substrate to the maximum incident laser energy density that forms the bond between the first substrate and the second substrate that is weaker than the first substrate comprises: determining a range of laser powers ranging from a minimum laser power sufficient to form the bond between the first substrate and the second substrate to a maximum laser power that forms the bond between the first substrate and the second substrate that is weaker than the first substrate; (b) determining the range of bond strengths ranging from the minimum bond strength formed using the minimum incident laser energy density to the maximum bond strength formed using the maximum incident laser energy density comprises: determining the range of bond strengths ranging from the minimum bond strength formed using the minimum laser power to the maximum bond strength formed using the maximum laser power; (c) determining the incident laser energy density, within the range of incident laser energy densities, corresponding to each intermediate bond as a function of the determined strength comprises: determining the laser power, within the range of laser power, corresponding to each intermediate bond as a function of the determined strength; and (d) forming the innermost bond at the minimum radius using the minimum incident laser energy density, the outermost bond at the maximum radius using the maximum incident laser energy density, and each intermediate bond at the determined radius using the determined incident laser energy density comprises: forming the innermost bond at the minimum radius using the minimum laser power, the outermost bond at the maximum radius using the maximum laser power, and each intermediate bond at the determined radius using the determined laser power.

According to a fifteenth aspect, the fourteenth aspect, wherein determining the minimum laser power comprises attempting to form a bond with a variety of laser powers, with at least one laser power insufficient to form a bond, and the lowest laser power that forms a bond is the minimum laser power.

According to a sixteenth aspect, any one of the fourteenth through fifteenth aspects, wherein determining the maximum laser power comprises (a) preparing pairs of samples of the first substrate and the second substrate, (b) stacking each pair of samples to form an interface between the first substrate and the second substrate, and subjecting the interface of each pair of samples to a different laser power from the minimum laser power upwards, forming at the interface of each pair a series of parallel and spaced bonds between the first substrate and the second substrate, (c) for each pair of samples, placing a wedge between the first substrate and the second substrate, and (d) for each pair of samples, forcing the wedge closer to the series of bonds until either (i) the bond nearest to the wedge becomes unbonded or (ii) the first substrate fractures; and the highest laser power that formed the series of bonds for which the bond nearest to the wedge became unbonded instead of the first substrate fracturing is the maximum laser power.

According to a seventeenth aspect, any one of the fourteenth through sixteenth aspects, wherein determining the range of bond strengths comprises (a) preparing samples of the first substrate and the second substrate, (b) stacking each pair of samples to form an interface between the first substrate and the second substrate, and subjecting the interface of each pair of samples to a different laser power within the range of laser powers to form a series of parallel and spaced bonds between the first substrate and the second substrate, (c) for each sample, placing a wedge between the first substrate and the second substrate, (d) forcing the wedge closer to the series of bonds formed by a particular laser power, (e) determining a distance between the wedge and the bond nearest the wedge at which the bond fractures, and (f) correlating the determined distances as a function of laser power; wherein, the determined distances range from a minimum distance relating to the bond formed from the maximum laser power, to a maximum distance relating to the bond formed from the minimum laser power.

According to an eighteenth aspect, the seventeenth aspect, wherein the determined distance decreases as the laser power increases.

According to a nineteenth aspect, any one of the sixteenth through eighteenth aspects, where in the wedge comprises a razor blade.

According to a twentieth aspect, any one of the seventeenth through nineteenth aspects, wherein determining the range of bond strengths comprises quantifying the effective fracture toughness ($K_{IC}$) of the bonds as a function of the determined distance.

According to a twenty-first aspect, the twentieth aspect, wherein quantifying the effective fracture toughness ($K_{IC}$) of the bonds as a function of the determined distance comprises using a numerical model that quantifies effective fracture toughness ($K_{IC}$) of bonds as a function of a distance at which a modeled wedge causes a bond to fracture.

According to a twenty-second aspect, the twenty-first aspect, wherein the numerical model uses as variables the thickness of the modeled wedge, the width of the bonds, spacing between adjacent bonds, thickness of the first substrate, thickness of the second substrate, Young's modulus of the first substrate, Young's modulus of the second substrate, Poisson's ratio of the first substrate, Poisson's ratio of the second substrate, shear modulus of the first substrate, and shear modulus of the second substrate.

According to a twenty-third aspect, the twenty-second aspect, wherein the numerical model quantifies stress intensity factors for longitudinal opening and in-plane shear for a range of assumed distances at which a crack is formed, and the effective fracture toughness ($K_{IC}$) from the stress intensity factors for longitudinal opening and in-plane shear.

According to a twenty-fourth aspect, the thirteenth aspect, wherein (a) determining the range of incident laser energy densities ranging from the minimum incident laser energy density sufficient to form the bond between the first substrate and the second substrate to the maximum incident laser energy density that forms the bond between the first substrate and the second substrate that is weaker than the first substrate comprises: determining a range of laser speeds ranging from a maximum laser speed sufficient to form the bond between the first substrate and the second substrate to a minimum laser speed that forms the bond between the first substrate and the second substrate that is weaker than the first substrate; (b) determining the range of bond strengths ranging from the minimum bond strength formed using the minimum incident laser energy density to the maximum bond strength formed using the maximum incident laser energy density comprises: determining the range of bond strengths ranging from the minimum bond strength formed using the maximum laser speed to the maximum bond strength formed using the minimum laser speed; (c) determining the incident laser energy density, within the range of incident laser energy densities, corresponding to each intermediate bond as a function of the determined strength comprises: determining the laser speed, within the range of laser speeds, corresponding to each intermediate bond as a function of the determined strength of each intermediate bond; and (d) forming the innermost bond at the minimum radius using the minimum incident laser energy density, the outermost bond at the maximum radius using the maximum incident laser energy density, and each intermediate bond at the determined radius using the determined incident laser energy density comprises: forming the innermost bond at the minimum radius using the maximum laser speed, the outermost bond at the maximum radius using the minimum laser speed, and each intermediate bond at the determined radius using the determined laser speed.

According to a twenty-fifth aspect, any one of the thirteenth through twenty-fourth aspects, wherein determining the range of bond radii comprises quantifying a pressure at which each bond bursts as a function of the radius of the bond for a range of effective fracture toughnesses ($K_{IC}$) of the bond.

According to a twenty-sixth aspect, the twenty-fifth aspect, wherein a numerical model quantifies the pressure at which each bond bursts as a function of the radius of the bond for the range of effective fracture toughnesses ($K_{IC}$) of the bond.

According to a twenty-seventh aspect, any one of the thirteenth through twenty-sixth aspects, wherein the ratio of the spacing to the width of the bonds is 1.75 to 3.5; and the number of bonds is at least 5.

According to a twenty-eighth aspect, any one of the thirteenth through twenty-seventh aspects, wherein determining the strength of each intermediate bond comprises quantifying an effective fracture toughness ($K_{IC}$) of each of the intermediate bonds as a function of the determined radius for each of the intermediate bonds and the assigned burst pressure.

According to a twenty-ninth aspect, the twenty-eighth aspect, wherein a numerical model quantifies the pressure at which each bond bursts as a function of the radius of the bond for the range of effective fracture toughnesses ($K_{IC}$) of the bond, and from that model, the effective fracture toughness ($K_{IC}$) of each of the intermediate bonds as a function of the determined radii and the assigned burst pressure.

According to a thirtieth aspect, the twenty-ninth aspect, wherein determining the strength of each intermediate bond comprises interpolating a graph that plots burst pressure as a function of radius of the bond for given effective fracture toughness ($K_{IC}$) values of the bond.

According to a thirty-first aspect, any one of the thirteenth through thirtieth aspects, where in determining the incident laser energy density corresponding to each intermediate bond comprises (a) using a numerical model that quantifies effective fracture toughness ($K_{IC}$) of bonds as a function of the radius of the bond and burst pressure to determine the fracture toughness ($K_{IC}$) for each intermediate bond, (b) using a numerical model that quantifies a distance at which a modeled wedge causes the bond to fracture as a function of effective fracture toughness ($K_{IC}$) of bonds to determine distance for each of the intermediate bonds as a function of the determined fracture toughnesses ($K_{IC}$), and (c) experimentally correlating the distance as a function of incident laser energy density to determine the incident laser energy density for each intermediate bond as a function of the determined distance for each intermediate bond.

According to a thirty-second aspect, the thirty-first aspect, wherein correlating the distance as a function of incident laser energy density comprises (a) preparing samples of the first substrate and the second substrate, (b) stacking each pair of samples to form an interface between the first substrate and the second substrate, and subjecting the interface of each pair of samples to a different incident laser energy density within the range of incident laser energy density to form a series of parallel and spaced bonds between the first substrate and the second substrate, (c) for each sample, placing a wedge between the first substrate and the second substrate, (d) forcing the wedge closer to the series of bonds formed by a particular incident laser energy density, (e) determining a distance between the wedge and the bond nearest the wedge at which the bond fractures, and (f) correlating the determined distances as a function of incident laser energy density.

According to a thirty-third aspect, anyone of the thirteenth through thirty-second aspects, wherein the minimum burst pressure is at least 1 MPa.

According to a thirty-fourth aspect, any one of the thirteenth through thirty-second aspects, wherein the minimum burst pressure is at least 2 MPa.

According to a thirty-fifth aspect, any one of the thirteenth through thirty-second aspects, wherein the minimum burst pressure is 2 MPa to 3 MPa.

According to the thirty-sixth aspect, any one of the thirteenth through thirty-fifth aspects, wherein the incident laser energy density is sequentially increased for each bond from the innermost bond to the outermost bond.

According to a thirty-seventh aspect, any one of the thirteenth through thirty-sixth aspects, where in the formed bonds are concentric about an axis.

According to a thirty-eighth aspect, any one of the thirteenth through thirty-seventh aspects, wherein the strengths of the bonds sequentially increase from the innermost bond, which has the minimum strength, to the outermost bond, which has the maximum strength.

According to a thirty-ninth aspect, any one of the thirteenth through thirty-eighth aspects, wherein the device is a liquid lens; and both the first substrate and the second substrate are glass.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
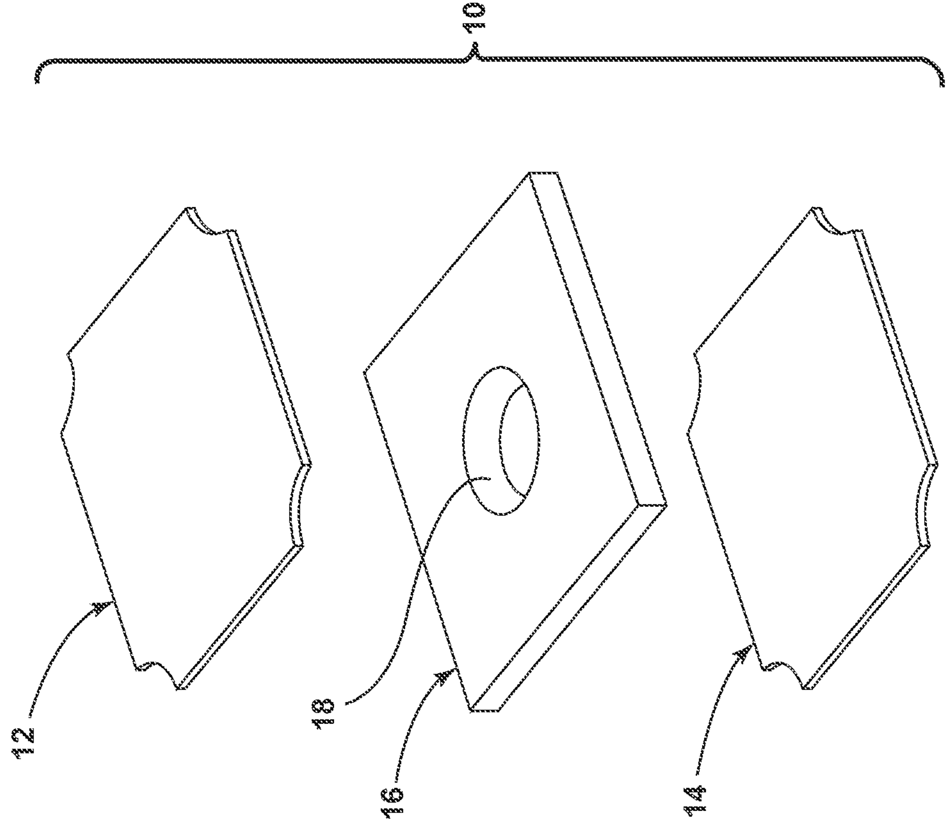
FIG. 1 is an exploded perspective view of some embodiments of a device, specifically a liquid lens, illustrating a second substrate with a through-hole, and the second substrate disposed between a first substrate and a third substrate.

Reference will now be made in detail to the present embodiments, examples of which are illustrated in the accompanying drawings. Whenever possible, the same reference numerals will be used throughout the drawings to refer to the same or like parts.

Figure 2:
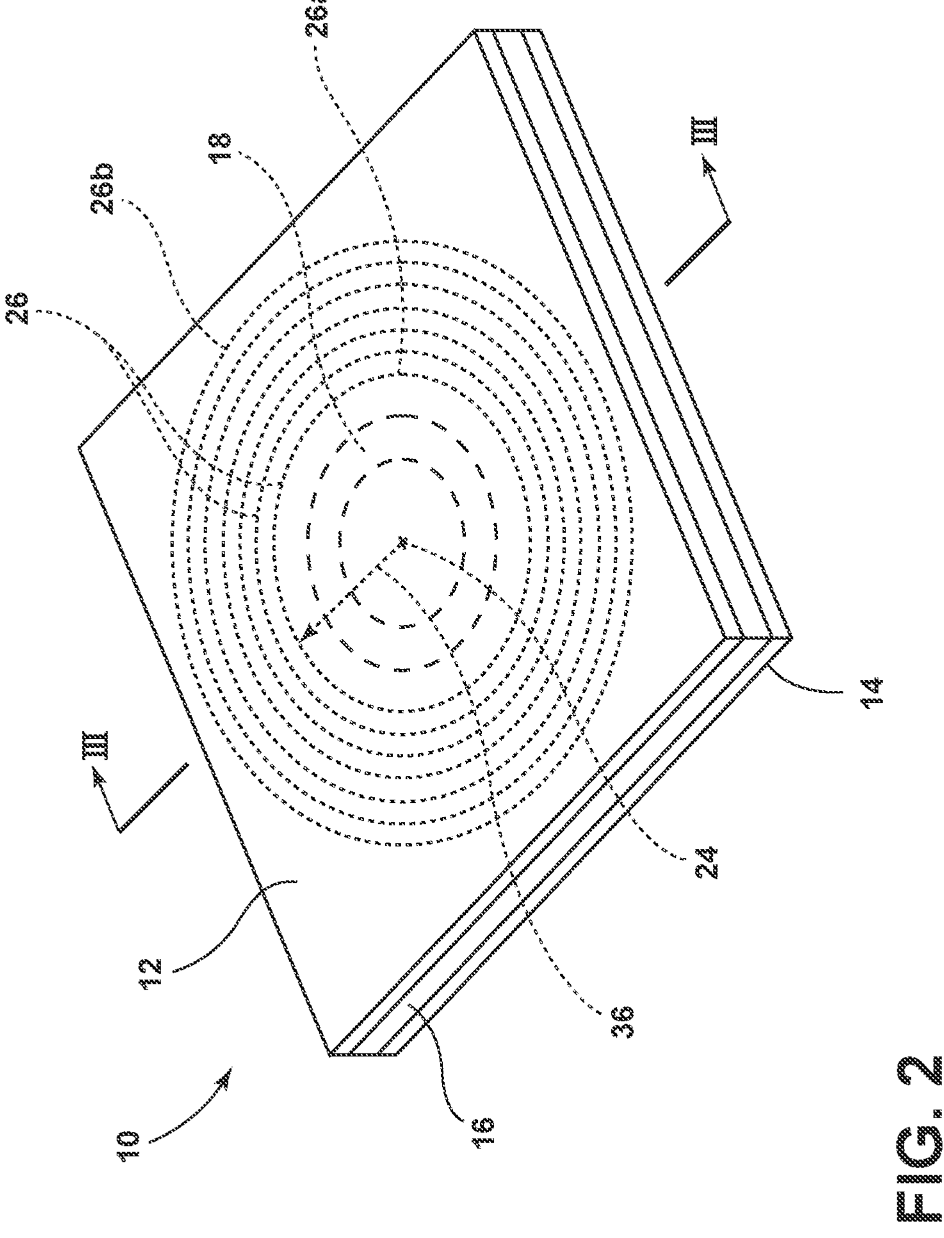
FIG. 2 is a perspective view of the device of FIG. 1, illustrating bonds that bond the first substrate and the second substrate, the bonds concentrically arranged around an axis that extends through the through-hole, and including an innermost bond and an outermost bond.
Figure 3:
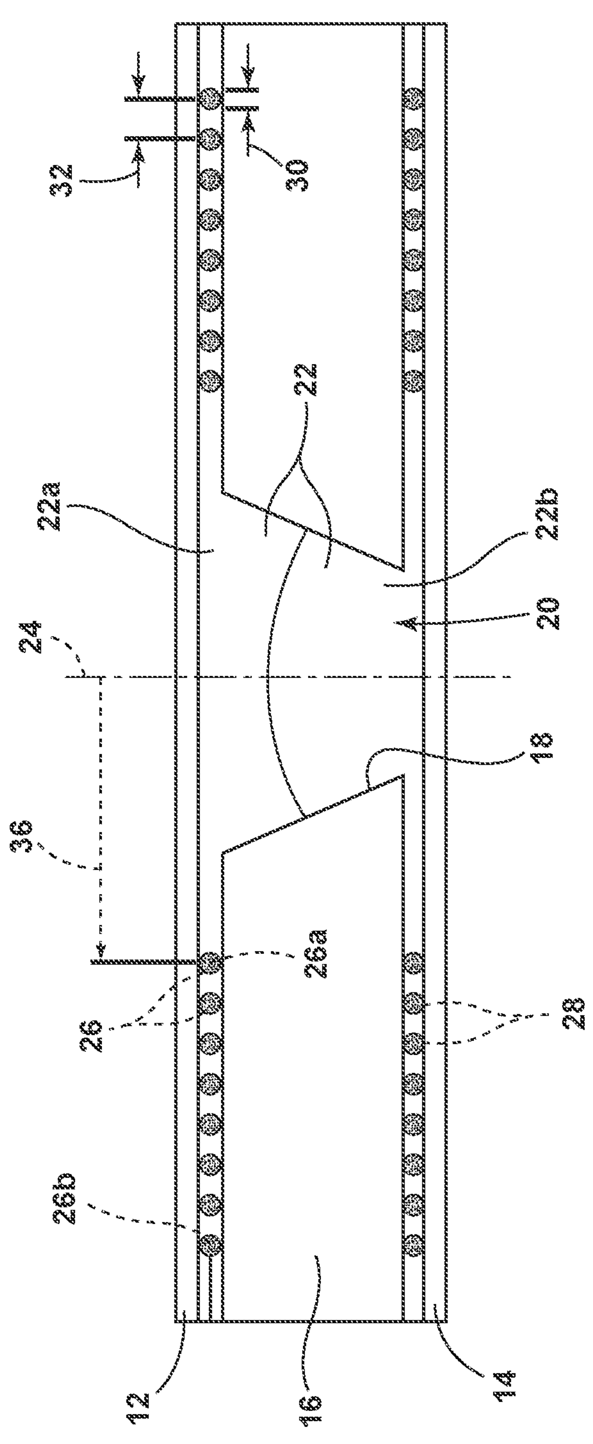
FIG. 3 is a cross-sectional view of the device of FIG. 1 taken through the line III-III of FIG. 2, illustrating adjacent bonds separated by equal spacing and each bond having the same width.

Referring to FIGS. 1-3, a device 10 with a first substrate 12 and a second substrate 16 is disclosed herein. In embodiments, the device 10 is a liquid lens. In other embodiments, the device 10 is an OLED, a MEMS device, such as a projector moving-mirror chip or a miniaturized radar glass package, or a microfluidic device, such as a flow cell or a microreactor. In embodiments, the device 10 includes the first substrate 12, a third substrate 14, and the second substrate 16 disposed between the first substrate 12 and the third substrate 14. In embodiments, the first substrate 12, the third substrate 14, and the second substrate 16 are all glass (e.g., have a glass composition comprising primarily, on an oxide basis, $SiO_2$). The second substrate 16 comprises a through-hole 18. The first substrate 12, the third substrate 14, and the through-hole 18 of the second substrate 16 define a cavity 20. In embodiments, liquid 22, including a first liquid 22*a* and a second liquid 22*b*, is disposed in the cavity 20. An axis 24 extends through the cavity 20. The first substrate 12 and the second substrate 16 are attached to each other via a plurality of bonds 26, which in embodiments are concentric about the axis 24. The plurality of bonds 26 include an innermost bond 26*a* and an outermost bond 26*b*. The innermost bond 26*a* can be the bond 26 positioned closest to the cavity 20 and/or the axis 24. The outermost bond 26*b* can be the bond 26 positioned farthest from the cavity 20 and/or the axis 24. In embodiments, the plurality of bonds 26 include at least one intermediate bond 26 disposed between the innermost bond 26*a* and the outermost bond 26*b*. Likewise, the third substrate 14 and the second substrate 16 are attached to each other via similar bonds 26. Only the bonds 26 that bond the first substrate 12 and the second substrate 16 are specifically discussed herein, but the disclosure applies equally as well to the bonds 26 between the second substrate 16 and the third substrate 14. The bonds 26 have a width 30. Each bond 26 is separated from the next adjacent bond by a spacing 32 (e.g., a center-to-center spacing or pitch between adjacent bonds). In embodiments, each bond 26 is centered about the axis 24 and separated from the axis 24 by a radius 36. The attributes and properties of the device 10 will be discussed further below.

I. METHOD OF MANUFACTURING THE DEVICE

Figure 4:
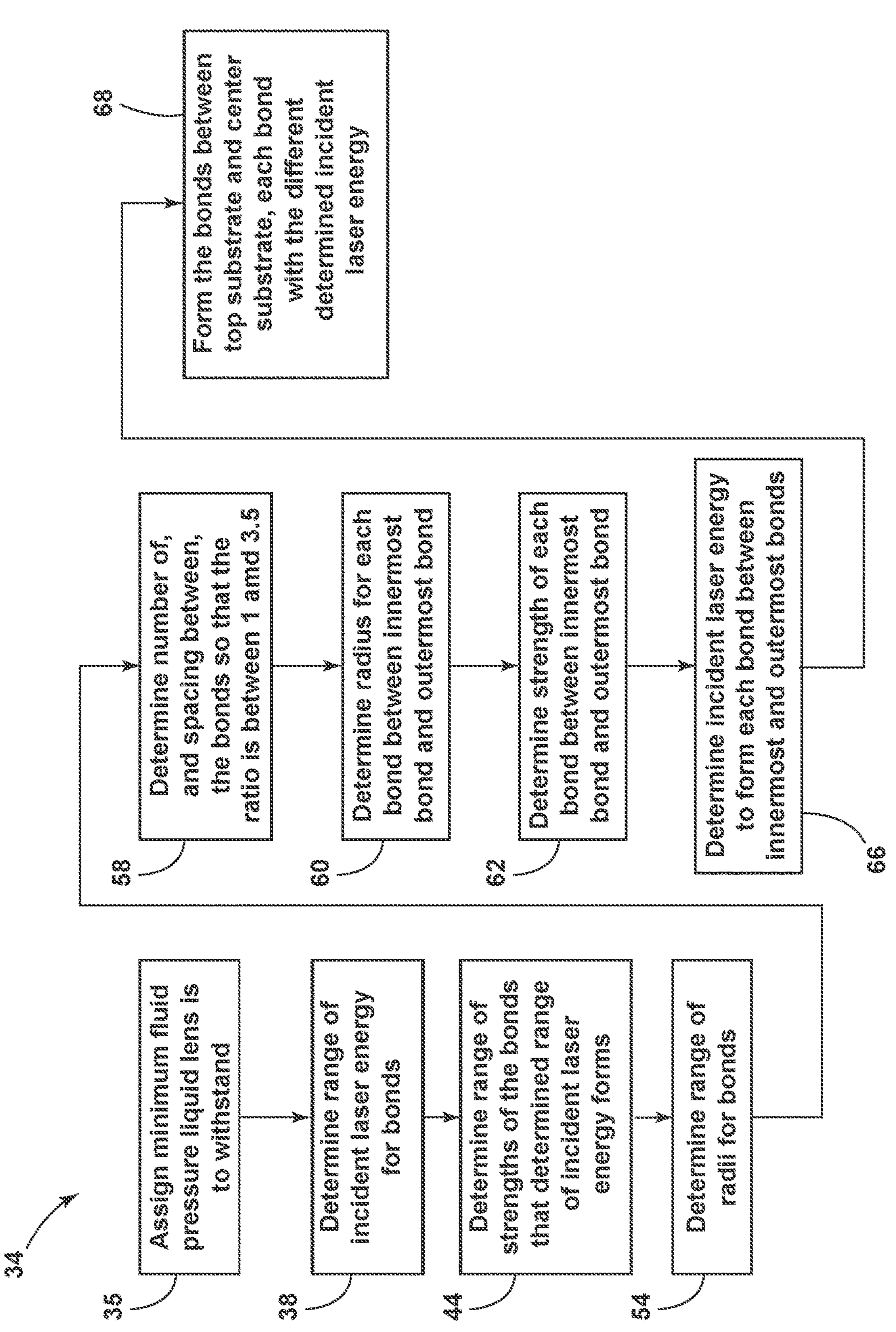
FIG. 4 is a flow chart of some embodiments of a method of manufacturing the device of FIG. 1.

Referring now to FIG. 4, a method 34 of manufacturing the device 10 is described.

A. Determine a Minimum Burst Pressure. At a step 35, the method 34 comprises assigning a minimum burst pressure. The minimum burst pressure is the minimum pressure within the cavity 20 (e.g., the minimum fluid pressure 56 (see FIG. 10) from the liquid 22 within the cavity 20) at which the device 10 is designed and manufactured to fail, pursuant to this method 34. For example, the device 10 designed and made pursuant to the method 34 is configured to withstand all fluid pressure 56 from the liquid 22 up to the minimum burst pressure without the first substrate 12 cracking (e.g., fracturing such that a crack extends entirely through a thickness of the first substrate 12) or the bonds 26 between the first substrate 12 and the second substrate 16 becoming unbonded. In embodiments, the minimum burst pressure is a purchaser requirement (e.g., a specification). The liquid 22 within the cavity 20 of the device 10 imparts the fluid pressure 56 that the device 10 manufactured pursuant to the method 34 is configured to withstand. In embodiments, the minimum burst pressure is at least 1 MPa, at least 2 MPa, between 1 MPa and 3 MPa, or between 2 MPa and 3 MPa.

Figure 5:
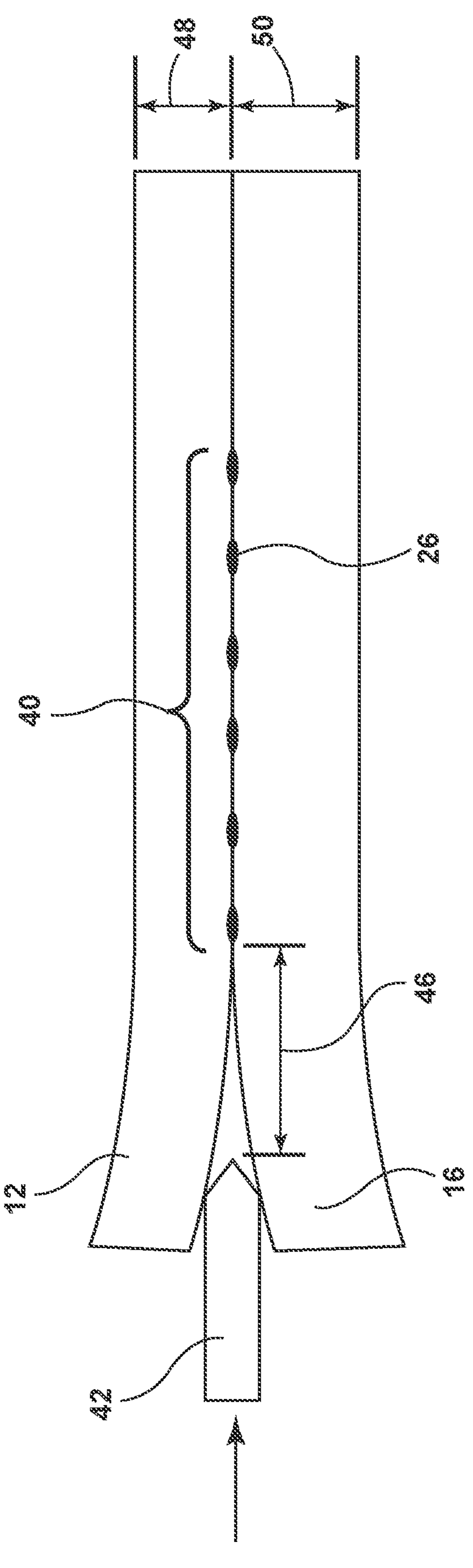
FIG. 5 is a cross-sectional view of a sample of the first substrate and the second substrate bonded with a series of bonds, and a wedge inserted between the first substrate and the second substrate to be forced toward the nearest bond of the series of bonds to determine the distance between the wedge and the nearest bond at which the nearest bond fractures, or whether the first substrate fractures instead, pursuant to several steps of the method of FIG. 4.
Figure 6:
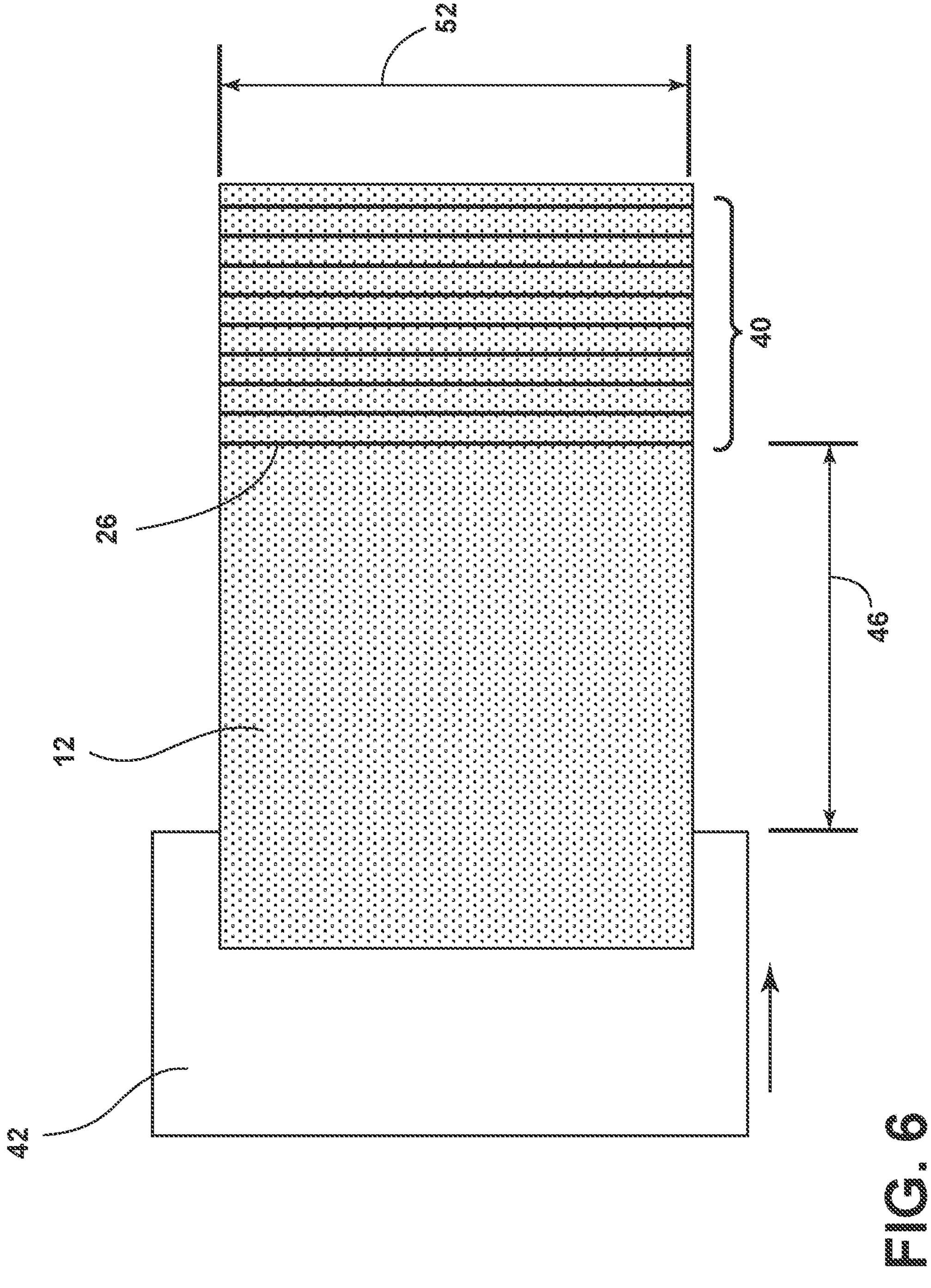
FIG. 6 is a top view of the sample of FIG. 5.
Figure 7:
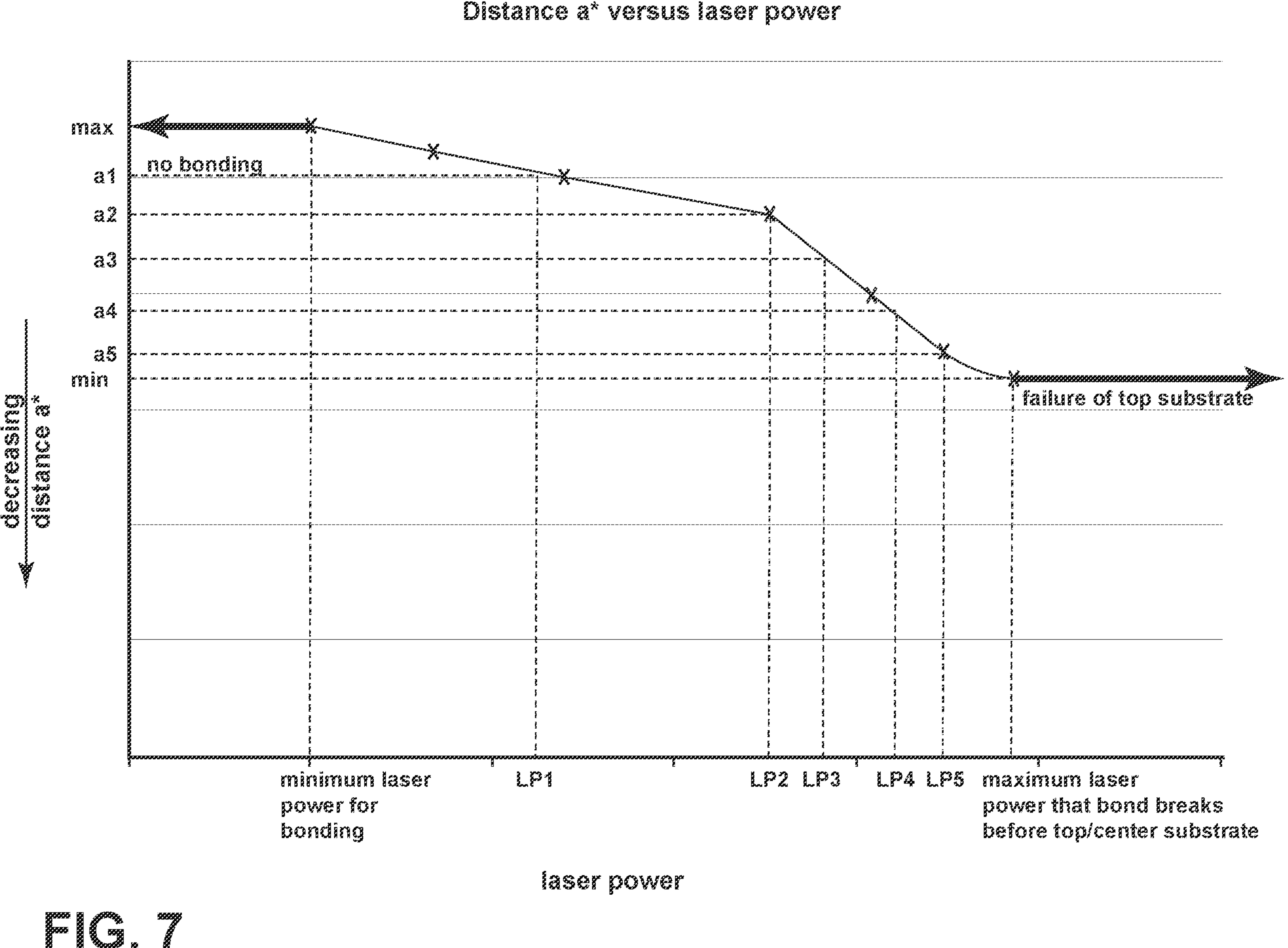
FIG. 7 is a graph plotting the experimentally determined distance between the wedge and the nearest bond at which the bond fractured as a function of the incident laser energy density (here, specifically, laser power at a constant laser speed and a constant laser spot size) used to form the bond, illustrating that the distance decreases from the maximum distance associated with the minimum incident laser energy density (here, the minimum laser power at a given laser speed and spot size) capable of forming the bond to the minimum distance associated with the maximum incident laser energy density (here, the maximum laser power at the given laser speed and spot size) capable of forming the bond with insufficient strength to cause the first substrate to fracture before the bond fails.

B. Determine Range of Incident Laser Energy Densities For Forming the Bonds. Referring now to FIGS. 5-7, in a step 38, the method 34 comprises determining a range of incident laser energy densities from a minimum incident laser energy density sufficient to form the bond 26 between the first substrate 12 and the second substrate 16 to a maximum incident laser energy density that forms the bond 26 between the first substrate 12 and the second substrate 16 that is weaker than the first substrate 12. That is, the maximum incident laser energy density forms the bond 26 that has a strength that is insufficient to cause fracture of the first substrate 12 rather than the bond 26 in response to a force separating the first substrate 12 from the second substrate 16 (such as from pressure 56). For example, the maximum incident laser energy density can be the highest incident laser energy density that forms the bond 26 with a strength that is sufficiently low that, upon applying an increasing force separating the first substrate 12 from the second substrate 16, the bond 26 becomes unbonded before the first substrate 12 fractures. The strength of the bond 26 is quantified herein in terms of "effective fracture toughness ($K_{IC}$)," although other quantifications and measurements of the strength of the bond 26 can be utilized. The incident laser energy density is the laser energy incident to the interface between the first substrate 12 and the second substrate 16 per unit area of the incident laser spot (i.e., spot size) at the interface. Thus, at a constant spot size and constant laser speed, the incident laser energy density increases as a function of increasing laser power (wattage). At a constant spot size and constant laser power, the incident laser energy density increases as a function of decreasing laser speed. At a constant laser power and constant laser speed, the incident laser energy density increases as a function of decreasing spot size.

In embodiments, at least one of the first substrate 12 or the second substrate 16 is substantially transparent (e.g., greater than 75% transmissivity) to the wavelength(s) of the emissions of the laser, and to facilitate emissions from the laser forming the bond 26 between the first substrate 12 and the second substrate 16, a laser absorbing film is disposed between the first substrate 12 and the second substrate 16. The laser absorbing film absorbs the emission from the laser, which causes localized heating and softening of the first substrate 12 and the second substrate 16. The first substrate 12 and the second substrate 16 then cool and form the bond 26. At relatively low incident laser energy density (e.g., relative lower laser powers or relatively high laser speeds), the laser absorbing film may survive the heating and act as an electrically conductive pathway for control of the device 10. At relatively high incident laser energy density (e.g., relatively high laser powers or relative low laser speeds), the laser absorbing film may diffuse into the first substrate 12 and the second substrate 16 throughout the bond 26. Example laser absorbing films include chromium oxynitride and chromium metal, although other metal, metal oxide, polymeric, or other materials may be used.

In embodiments, to determine the minimum incident laser energy density, the laser attempts to bond the first substrate 12 and the second substrate 16 at a variety of incident laser energy densities. Some incident laser energy densities will be insufficient to form the bond 26 between the first substrate 12 and the second substrate 16. The lowest incident laser energy density that results in the formation of the bond 26 between the first substrate 12 and the second substrate 16 can be designated as the minimum incident laser energy density.

In embodiments, to determine the maximum incident laser energy density, (a) pairs of samples of the first substrate 12 and the second substrate 16 are prepared, (b) every pair of samples is stacked to form an interface between the first substrate 12 and the second substrate 16, and the interface of each pair is subjected to a different incident laser energy density, from the minimum incident laser energy density upwards, forming at the interface of each pair a series 40 of parallel and spaced bonds 26 between the first substrate 12 and the second substrate 16, (c) a wedge 42 is placed between the first substrate 12 and the second substrate 16, and (d) the wedge 42 is forced closer to the series 40 of bonds 26 until either (i) the bond 26 nearest to the wedge 42 fails (e.g., becomes unbonded) or (b) the first substrate 12 fractures.

For (a), the pairs of samples can be generally rectangular and have a width 52 (see FIG. 6) that is narrower that a width of the wedge 42. For example, a thickness 48 of the first substrate 12 of the sample and a thickness 50 of the second substrate 16 of the samples (see FIG. 5) can be the same, such as 0.5 mm. An example width 52 for each substrate 12, 16 of the same is 1 inch, and an example length (orthogonal to the width 52) is 3 inches. At least one of the first substrate 12 and the second substrate 16 is coated with film absorbing at the incident laser wavelength to provide the interfacial heating.

For (b), the bonds 26 are all straight and parallel to each other, and are center-to-center spaced at the spacing 32 so that the spacing-to-width ratio (of the bonds 26) is greater than 5. The bonds 26 extend across the entire width 42 of the now-bonded substrates 12, 16. The first bond 26 of the series 40 of bonds 26 can be about 0.5 inch from the edge of the stacked substrates 12, 16, allowing space to insert and move the wedge 42 closer to the first bond 26 o the series 40 of bonds 26. For one sample, the minimum incident laser energy density is selected to form the series 40 of bonds 26. For the next sample, the series 40 of bonds 26 is formed with an increased incident laser energy density, and so on for each subsequent sample Assuming increasing laser power to increase the incident laser energy density, the laser can be configured to provide a constant spot size (e.g., 10-15 um spot size) at a constant laser speed (e.g., 50 to 300 mm/s). The laser can be pulsed with repetition rate from 10 kHz to 500 kHz, or the laser can be continuous wave. The pulse duration for pulsed laser is typically 5 to 20 ns.

For (c) and (d), the wedge 42 is a #60.15-0.14 mm thick razor blade from Lutz Blades (Solingen, Germany). For (d) a plunger-style digital micrometer (Mitutoyo, Japan MHD-2" MB-164-164) is used to translate the razor blade wedge 42 slowly towards the closest bond 26, approximately at a rate of ~1 mm per minute. The highest incident laser energy density that forms the series 40 of bonds 26 for which the bond 26 nearest to the wedge 42 fails before the first substrate 12 fractures can be designated as the maximum incident laser energy density. A camera can be utilized to monitor when the first substrate 12 of the bond 26 breaks.

In embodiments, the incident laser energy density is a function of the laser power (i.e., the power of the laser, typically expressed in Watts or milliwatts) and the laser speed (i.e., how fast the laser emission and substrates 12, 16 are translating relative to each other). In embodiments, the incident laser energy density is varied by varying the laser power using a constant laser speed and constant spot size. The higher the laser power, the higher the incident laser energy density. The lower the laser power, the lower the incident laser energy density. In other embodiments, the incident laser energy density is varied by varying the laser speed using a constant laser power and constant spot size. The slower the laser speed, the higher the incident laser energy density. The faster the laser speed, the lower the incident laser energy density. In still other embodiments, the incident laser energy density is varied by varying the spot size using constant laser speed and constant laser power. The smaller the spot size, the higher the incident laser energy density. The larger the spot size, the lower the incident laser energy density.

Thus, in embodiments, the step 38 of determining the range of incident laser energy density comprises determining a range of laser power (e.g., in Watts or milliwatts, at a constant laser speed and constant spot size) ranging from a minimum laser power sufficient to form the bond 26 between the first substrate 12 and the second substrate 16 to a maximum laser power that forms the bond 26 between the first substrate 12 and the second substrate 16 that is weaker than the first substrate 12.

In these embodiments, to determine the minimum laser power, the laser attempts to bond the first substrate 12 and the second substrate 16 at a variety of laser powers. Some laser powers will be insufficient to form the bond 26 between the first substrate 12 and the second substrate 16. The lowest laser power that results in the formation of the bond 26 between the first substrate 12 and the second substrate 16 can be designated as the minimum laser power. For example, the laser may attempt to form the bond 26 with laser powers of 0.4 W, 0.5 W, 0.6 W, and 0.7 W. If the laser power of 0.4 W is insufficient to form the bond 26, but laser powers of 0.5 W, 0.6 W, and 0.7 W form the bond 26, then 0.5 W would be the minimum laser power.

In embodiments, to determine the maximum laser power, (a) pairs of samples of the first substrate 12 and the second substrate 16 are prepared, (b) every pair of samples is stacked to form an interface between the first substrate 12 and the second substrate 16, and the interface of each pair is subjected to a different laser power, from the minimum laser power upwards, forming at the interface of each pair a series 40 of parallel and spaced bonds 26 between the first substrate 12 and the second substrate 16, (c) the wedge 42 is placed between the first substrate 12 and the second substrate 16, and (d) the wedge 42 is forced closer to the series 40 of bonds 26 until either (i) the bond 26 nearest to the wedge 42 fails (e.g., becomes unbonded) or (b) the first substrate 12 fractures. The highest laser power that forms the series 40 of bonds 26 for which the bond 26 nearest to the wedge 42 fails before the first substrate 12 fractures can be designated as the maximum laser power. For example, if laser powers of 0.6 W, 0.7 W, and 0.8 W all form a series 40 of bonds 26 in which the bond 26 nearest the wedge 42 fails before the first substrate 12 fractures in response to the wedge 42, but a laser power of 0.9 W forms a series 40 of bonds 26 in which the first substrate 12 fractures in response to the wedge 42 before the bond 26 nearest the wedge 42 fails, then 0.8 W is the maximum laser power. The experimental details are otherwise as described above to determine the maximum incident laser energy density.

In other embodiments, the step 38 of determining the range of incident laser energy densities comprises determining a range of laser speed ranging from a maximum laser speed (e.g., at a constant laser power in Watts or milliwatts and constant spot size) sufficient to form the bond 26 between the first substrate 12 and the second substrate 16 to a minimum laser speed that forms the bond 26 between the first substrate 12 and the second substrate 16 that is weaker than the first substrate 12. The same protocol described above to determine the range of laser power can be utilized to determine the range of laser speed, but varying laser speed at constant laser power instead of varying laser power at constant laser speed.

C. Determining Range of Strengths of the Bonds Formed by the Range of Incident Laser Energy Densities. In a step 44, the method 34 comprises determining a range of bond strengths of the bonds 26, from a minimum bond strength formed using the minimum incident laser energy density, to a maximum bond strength formed using the maximum incident laser energy density. In embodiments, step 44 comprises determining the range of bond strengths ranging from the minimum bond strength formed using the minimum laser power to the maximum bond strength formed using the maximum laser power (assuming constant laser speed and constant spot size). In other embodiments, step 44 comprises determining the range of bond strengths ranging from the minimum bond strength formed using the maximum laser speed to the maximum bond strength formed using the minimum laser speed (assuming constant laser power and constant spot size).

i. Correlating the Distances at Which the Wedge Causes a Bond to Fracture as a Function of Incident Laser Energy Density that Created the Bond. In embodiments, determining the range of bond strengths of the bonds 26 comprises (a) preparing samples of the first substrate 12 and the second substrate 16, (b) stacking each pair of samples to form an interface between the first substrate 12 and the second substrate 16, and subjecting the interface of each pair of samples to a different incident laser energy density within the range of incident laser energies to form a series 40 of parallel and spaced bonds 26 between the first substrate 12 and the second substrate 16, (c) for each pair of samples, placing the wedge 42 between the first substrate 12 and the second substrate 16, (d) forcing the wedge 42 closer to the series 40 of bonds 26 formed by a particular incident laser energy density, (e) determining a distance 46 (a*) between the wedge 42 and the bond 26 nearest the wedge 42 at which the bond 26 fractures, and (f) correlating the determined distances 46 (a*) as a function of incident laser energy density. The experimental details for (a) through (d) are otherwise as set forth above to determine to determine the maximum incident laser energy density. As will become apparent, the distance 46 (a*) is related to the strength of the bond 26 (e.g. as quantified by the effective fracture toughness ($K_{IC}$) of the bond 26), and varies as a function of the incident laser energy density used to form the bond 26. For this relevant range of incident laser energy density between the minimum incident laser energy density and the maximum incident laser energy density, the wedge 42 is forced closer to the series 40 of bonds 26 until the bond 26 nearest the wedge 42 fails, and the distance 46 (a*) between the wedge 42 and the nearest bond 26 when the nearest bond 26 fails is recorded. The distance 46 (a*) may be referred to herein as the "crack length," e.g., the length between the nearest bond 26 and the wedge 42 at which the bond 26 cracked.

In embodiments where incident laser energy density is varied by varying laser power at constant laser speed and constant spot size, determining the range of bond strengths of the bonds 26 comprises (a) preparing samples of the first substrate 12 and the second substrate 16, (b) stacking each pair of samples to form an interface between the first substrate 12 and the second substrate 16, and subjecting the interface of each pair of samples to a different laser power within the range of laser powers to form a series 40 of parallel and spaced bonds 26 between the first substrate 12 and the second substrate 16, (c) for each pair of samples, placing a wedge 42 between the first substrate 12 and the second substrate 16, (d) forcing the wedge 42 closer to the series 40 of bonds 26 formed by a particular laser power, (e) determining a distance 46 (a*) between the wedge 42 and the bond 26 nearest the wedge 42 at which the bond 26 fractures, and (f) correlating the determined distances 46 (a*) as a function of laser power. The experimental details for (a) through (d) are otherwise as set forth above to determine to determine the maximum incident laser energy density. As will become apparent, the distance 46 (a*) is related to the strength of the bond 26 (e.g. as quantified by the effective fracture toughness ($K_{IC}$) of the bond 26), and varies as a function of the laser power used to form the bond 26. For this relevant range of laser powers between the minimum laser power and the maximum laser power, the wedge 42 is forced closer to the series 40 of bonds 26 until the bond 26 nearest the wedge 42 fails, and the distance 46 (a*) between the wedge 42 and the nearest bond 26 when the nearest bond 26 fails is recorded. The distance 46 (a*) may be referred to herein as the "crack length," e.g., the length between the nearest bond 26 and the wedge 42 at which the bond 26 cracked.

In embodiments where incident laser energy density is varied by varying laser speed at constant laser power and constant spot size, determining the range of bond strengths of the bonds 26 comprises the same steps (a) through (f) as the paragraph above, except in (b) the interface of each pair of samples is subjected to a different laser speed within the range of laser speeds to form a series 40 of parallel and spaced bonds 26 between the first substrate 12 and the second substrate 16, in (d) the wedge 42 is forced closer to the series 40 of bonds 26 formed by a particular laser speed, and in (f) determined distances 46 (a*) are correlated as a function of laser speed. The experimental details for (a) through (d) are otherwise as set forth above to determine to determine the maximum incident laser energy density. As will become apparent, the distance 46 (a*) is related to the strength of the bond 26 (e.g. as quantified by the effective fracture toughness ($K_{IC}$) of the bond 26), and varies as a function of the laser speed used to form the bond 26. For this relevant range of laser speed between the maximum laser speed and the minimum laser speed, the wedge 42 is forced closer to the series 40 of bonds 26 until the bond 26 nearest the wedge 42 fails, and the distance 46 (a*) between the wedge 42 and the nearest bond 26 when the nearest bond 26 fails is recorded. The distance 46 (a*) may be referred to herein as the "crack length," e.g., the length between the nearest bond 26 and the wedge 42 at which the bond 26 cracked.

FIG. 7 is a graph showing the distance 46 (a*) as a function of the incident laser energy density (here, specifically laser power at constant laser speed and constant spot size) that formed the bond 26 that cracked at that distance 46 (a*) for a hypothetical example. The determined distances 46 (a*) range from a minimum distance 46 (a*) related to the bond 26 formed from the maximum laser power (i.e., maximum incident laser energy density), to a maximum distance 46 (a*) related to the bond 26 formed from the minimum laser power (i.e., minimum incident laser energy density). More specifically, the minimum laser power formed the bond 26 that fractured at the maximum distance 46 (a*). Higher power LP1 resulted in a bond 26 that fractured at a smaller distance 46 (a*) a1, and so on for increasing laser powers LP2 to LP5 and decreasing distances a1 to a5. The maximum laser power formed the bond 26 that fractured at the minimum distance 46 (a*). As illustrated, the determined distance 46 (a*) decreases as the laser power (i.e. incident laser energy density) that formed the bond 26 increases. Without being bound by theory, it is thought that the higher the incident laser energy density used to form the bond 26, the stronger the bond 26. Stated another way, the stronger the bond 26 is, the more the bond 26 can withstand the separation force that the wedge 42 causes, and the more the distance 46 (a*) between the wedge 42 and the bond 26 decreases. As discussed above, incident laser energy density above the maximum incident laser energy density (and thus outside of the range of incident laser energy density) form the bond 26 with a strength relative to the strengths of the first substrate 12 such that the wedge 42 causes the first substrate 12 to break instead of the bond 26 failing (e.g., the bonds 26 corresponding to incident laser energy density greater than the maximum incident laser energy density are stronger than the first substrate 12). The strength of the bond 26 is typically less than the first substrate 12, because the laser emissions that form the bond 26 induce damage to the substrates 12, 16 bonded together at the bond 26. Incident laser energy densities between the minimum incident laser energy density and the maximum incident laser energy density create bonds 26 that have a strength relative to the strength of the first substrate 12 such that the wedge 42 causes the bond 26 to break rather than the first substrate 12. Incident laser energy densities between and including the minimum incident laser energy density and the maximum incident laser energy density define the range of incident laser energy densities to be used to form the bonds 26 of the device 10 pursuant to the method 34.

In embodiments, in performing this experimentation with the wedge 42 to determine the distance 46 (a*) at which the bond 26 breaks as a function of incident laser energy density used to form the bond 26, it is preferable that the first substrate 12 has a thickness 48 and the second substrate 16 has a thickness 50 that are equal for each sample. This helps assure that the wedge 42 is testing the strength of the bonds 26 rather than the strength of the first substrate 12.

ii. Quantify the Effective Fracture Toughnesses of the Bonds Created by the Range of Incident Laser Energy Densities. In embodiments, determining the range of strengths of the bonds 26 formed using the range of incident laser energy densities comprises quantifying the effective fracture toughnesses ($K_{IC}$) of the bonds 26 as a function of the determined distances (a*). The "effective fracture toughness" is symbolized as $K_{IC}$ herein and is a quantification of the strength of the bond 26. The effective fracture toughness ($K_{IC}$) of the bond 26 is a material attribute that is a function of the incident laser energy density used to create the bond 26.

Figure 8:
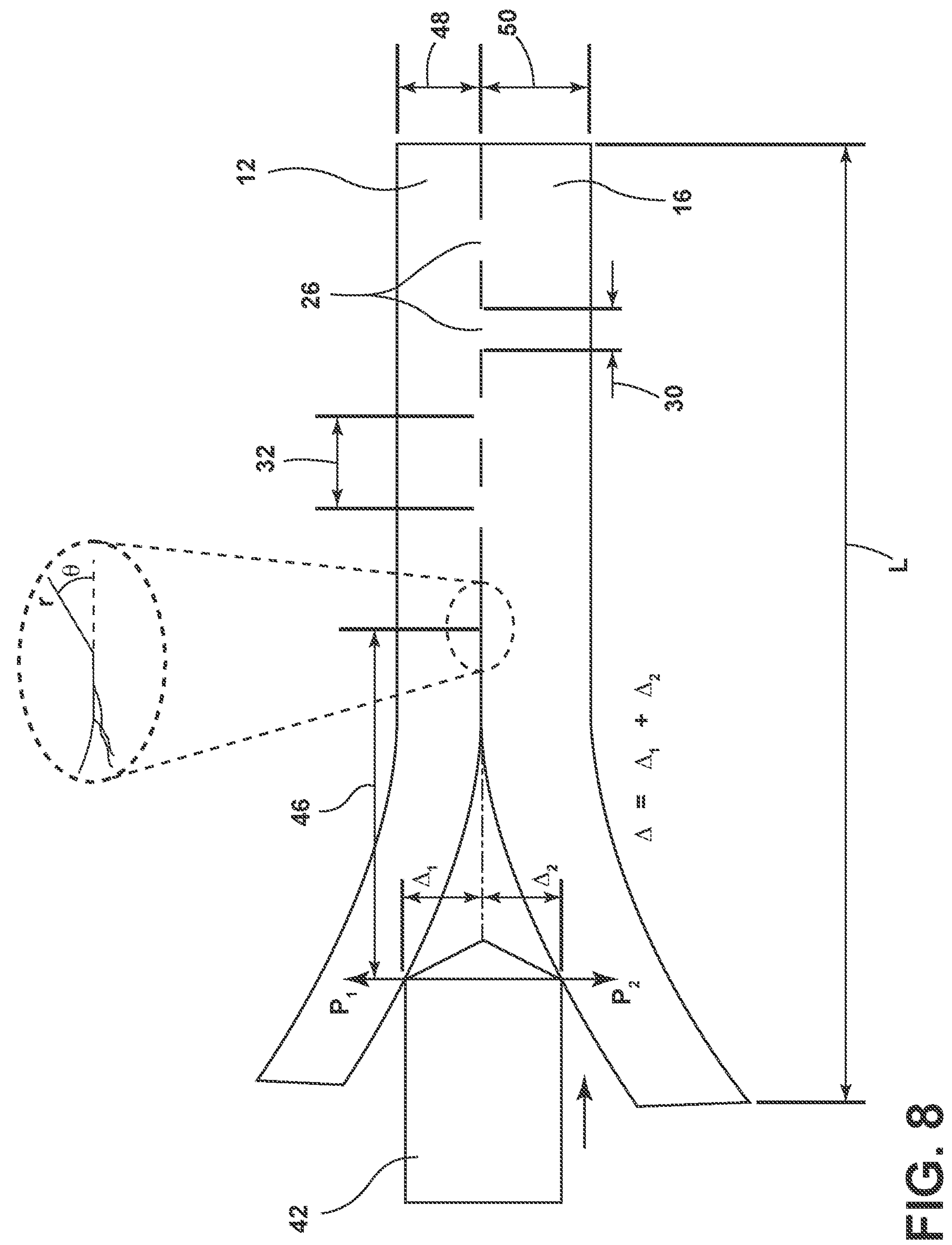
FIG. 8 is a cross-sectional schematic view of a numerically modeled wedge causing displacements of a double cantilever extending from a bond representing the first substrate and the second substrate of FIG. 5.
Figure 9:
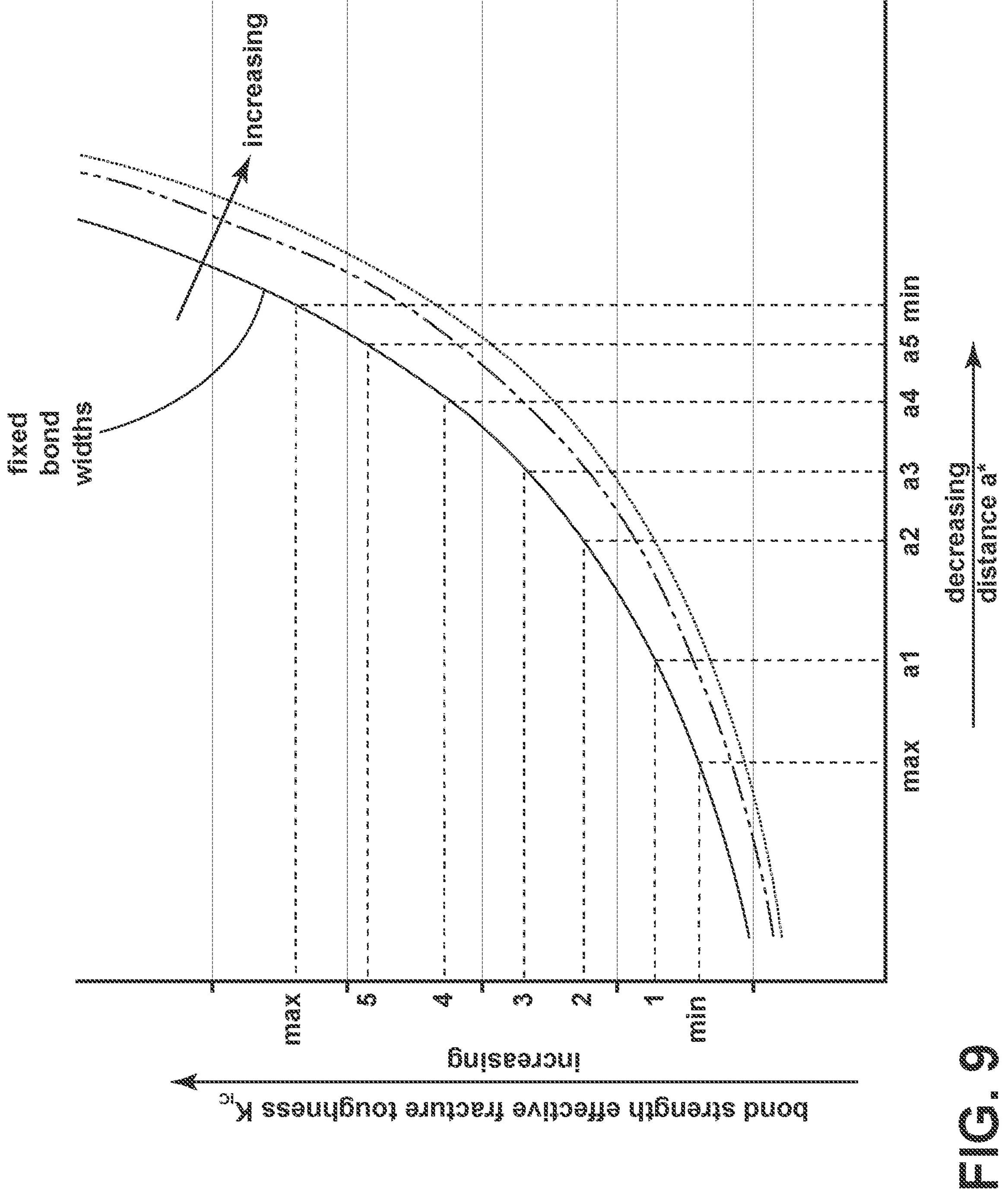
FIG. 9 is a graph produced from the numerically modeled wedge scenario of FIG. 8, illustrating effective fracture toughness ($K_{IC}$) as a function of the distance between the modeled wedge and the bond at which the bond fractured for several assumed widths of the bond, with the effective fracture toughness ($K_{IC}$) increasing as a function of decreasing distance.

Referring now to FIGS. 8 and 9, in embodiments, quantifying the effective fracture toughness ($K_{IC}$) of the bonds 26 as a function of the determined distance 46 (a*) comprises using a numerical model that quantifies effective fracture toughness ($K_{IC}$) of bonds 26 as a function of an assumed distance 46 (a*) at which a modeled wedge 42 causes the bond to fracture. In embodiments, the numerical model utilizes boundary element modeling ("BEM"). In other embodiments, the numerical model utilizes finite difference methods.

In still other embodiments, the numerical model utilizes finite element modeling ("FEM"). The finite element modeling disclosed herein models the experimental test using the wedge 42 explained above using principles of linear elastic fracture mechanics ("LEFM"). The modeling utilizes as variables the thickness (A) of the wedge 42, the width 30 (w) of the bonds 26, the spacing 32 (s) between adjacent bonds, the thickness 48 ($t_1$) of the first substrate 12, the thickness 50 ($t_2$) of the second substrate 16, the Young's modulus ($E_1$) of the first substrate 12, the Young's modulus of the second substrate 16 ($E_2$), the Poisson ratio ($v_1$) of the first substrate 12, the Poisson ratio ($v_2$) of the second substrate 16, the shear modulus ($\mu t_1$) of the first substrate 12, and the shear modulus ($\mu_2$) of the second substrate 16. The model considers the bond 26 to be homogenous. The modeling models the wedge 42 inserted between the first substrate 12 and the second substrate 16 causing displacements ($\Delta_1$ and $\Delta_2$) at a distance 46 (a*) from the nearest bond 26. The displacements ($\Delta_1$ and $\Delta_2$) cause finite loads ($P_1$ and $P_2$) upon the first substrate 12 and the second substrate 16 with stress concentrated at the nearest bond 26. The model assumes the bond 26 fractures at a variety of distances 46 (a*) and the model calculates an effective fracture toughness ($K_{IC}$) of the bond 26 for each of the assumed distances 46 (a*). The model can produce a graph such as the hypothetical graph shown at FIG. 9, showing different curves for several different widths 30 of the bond 26. Note that, in general, the wider the width 30 of the bond 26, the shorter the distance 46 (a*) that the wedge 42 can be moved toward the bond 26 before the bond 26 breaks.

More specifically, the model begins with the premise that the first substrate 12 and the second substrate 16 form a double cantilever extending away from the bond 26, as illustrated in FIG. 8. The bond 26 has a specific fracture energy (Γ), and the wedge 42 causing displacements ($\Delta_1$, $\Delta_2$) of the first substrate 12 and the second substrate 16 causes a crack to propagate through the bond 26 only when the crack would release potential energy (U) that is greater than the specific fracture energy of the bond 26 (Γ). This change in potential energy (U) per unit of crack advance is quantified as the Griffith energy release rate:

$$G(a) = -\frac{\partial U}{\partial a}(a) \tag{1}$$

The potential energy (U) from the wedge 42 placed between the first substrate 12 and the second substrate 16, assuming no exchange of energy from the wedge 42 and the substrates 12, 16 during virtual crack propagation (e.g., the wedge 42 is under displacement control), is:

$$U = \frac{1}{2}P\Delta \tag{2}$$

where (P) is the force that the wedge imposes upon the substrates 12, 16. Upon inserting equation (2) into equation (1), for a fixed width (B) of the substrates 12, 16, the Griffith energy release rate (G) becomes:

$$G = -\frac{\Delta}{2B}\left(\frac{\partial P}{\partial a}\right)_\Delta = -\frac{\Delta}{2B}\left(\frac{\partial}{\partial a}\left(\frac{\Delta}{C}\right)\right)_\Delta = \frac{\Delta^2}{2BC^2}\left(\frac{\partial C}{\partial a}\right)_\Delta \tag{3}$$

where, $$C = \frac{4a^3}{B}\left(\frac{1}{E_1t_1^3} + \frac{1}{E_2t_2^3}\right) \tag{4}$$

$$\frac{\partial C}{\partial a} = \frac{12a^2}{B}\left(\frac{1}{E_1t_1^3} + \frac{1}{E_2t_2^3}\right) \tag{5}$$

Applying the moments of a double cantilever beam yields:

$$\Delta_1 = \frac{Pa^3}{3E_1I_1} \tag{6}$$

$$\Delta_2 = \frac{Pa^3}{3E_2I_2} \tag{7}$$

where, $$I_1 = \frac{Bt_1^3}{12} \tag{8}$$

$$I_2 = \frac{Bt_2^3}{12} \tag{9}$$

Thus, $$\Delta = \Delta_1 + \Delta_2 = \frac{4Pa^3}{B}\left(\frac{1}{E_1t_1^3} + \frac{1}{E_2t_2^3}\right) \tag{10}$$

Finally, the equation for the Griffith energy release rate (G) thus becomes:

$$G = \frac{3\Delta^2}{8a^4}\left(\frac{E_1t_1^3E_2t_2^3}{E_1t_1^3 + E_2t_2^3}\right) \tag{11}$$

The effective fracture toughness ($K_{IC}$) of the bond 26, which resists the change in potential energy (U), is related to the Griffith energy release rate (G) as:

$$G_c = \frac{K_{IC}^2}{E} \tag{12}$$

With the thicknesses ($t_1$, $t_2$), the Young's moduli ($E_1$, $E_2$), and the combined displacement (Δ) (as the thickness of the modeled wedge 42) all being known, the effective fracture toughness ($K_{IC}$) of the bond 26 can be calculated for any particular assumed distance 46 (a as a*) at which the crack forms. It should be noted that the above model assumes that the crack extends parallel to the interface between the first substrate 12 and the second substrate 16 (e.g., through the bond 26), although cracks may occur in directions other than parallel.

While the wedge 42 can cause a crack to propagate through the bond 26, a crack can alternatively propagate at a distinct angle (θ) through the first substrate 12, or between the bond 26 and the first substrate 12. In another numerical model, to determine the angle (θ), three failure modes are considered, each having an associated stress intensity factor. The three failure modes are: (i) Mode I—longitudinal opening, which has a stress intensity factor $K_I$; (ii) Mode II—in-plane shear, which has a stress intensity factor $K_{II}$; and (iii) Mode III—out-of-plane shear, which has a stress intensity factor $K_{III}$. In terms of the Griffith energy release rate (G) balance:

$$G(a) = \frac{(1-\nu^2)}{E}\cdot\left(K_I^2 + K_{II}^2\right) + \frac{K_{III}^2}{2\mu} \tag{13}$$

The stress intensity factors $K_I$, $K_{II}$, and $K_{III}$ determine the direction θ in which the crack propagates. The stress field at the edge of the bond 26 is:

$$\sigma_{ij} = \frac{1}{\sqrt{2\pi r}}\left[K_I f_{I,ij}(\theta) + K_{II} f_{II,ij}(\theta) + K_{III} f_{III,kz}(\theta)\right] \tag{14}$$

where (i, j=x, y and k=x, y). The model can assume that Mode III (out-of-plane shear) is negligible and thus can ignore the associated stress intensity factor $K_{III}$. For Mode I—longitudinal opening—the stress field has stress components ($\sigma_x$, $\sigma_y$, $\sigma_{xy}$) and tip displacements ($u_x$, $u_y$), and the stress field is:

$$\begin{bmatrix}\sigma_{xx}\\ \sigma_{xy}\\ \sigma_{yy}\end{bmatrix} = \frac{K_I}{2\pi r}\cos\frac{\theta}{2}\begin{bmatrix}1-\sin\frac{\theta}{2}\sin\frac{3\theta}{2}\\ \sin\frac{\theta}{2}\cos\frac{3\theta}{2}\\ 1+\sin\frac{\theta}{2}\sin\frac{3\theta}{2}\end{bmatrix} + \begin{bmatrix}T\\ 0\\ 0\end{bmatrix} + O\left(r^{-\frac{1}{2}}\right) \tag{15}$$

$$\begin{bmatrix}u_x\\ u_y\end{bmatrix} = \frac{K_I}{2\mu}\left(\frac{r}{2\pi}\right)^{\frac{1}{2}}\begin{bmatrix}\cos\frac{\theta}{2}\cdot\left(\kappa-1+2\sin^2\frac{\theta}{2}\right)\\ \sin\frac{\theta}{2}\cdot\left(\kappa+1-2\cos^2\frac{\theta}{2}\right)\end{bmatrix} + \tag{16}$$

-continued $$\frac{Tr}{2(1+\nu)\mu}\begin{bmatrix}(1-\nu^2)\cos\theta \\ -(\nu+\nu^2)\sin\theta\end{bmatrix}+O\left(r^{\frac{3}{2}}\right)$$

For Mode II—in-plane shear—the stress field has stress components ($\sigma_x$, $\sigma_y$, $\sigma_{xy}$) and tip displacements ($u_x$, $u_y$), and the stress field is:

$$\begin{bmatrix}\sigma_{xx}\\ \sigma_{xy}\\ \sigma_{yy}\end{bmatrix}=\frac{K_{II}}{\sqrt{2\pi r}}\begin{bmatrix}-\sin\frac{\theta}{2}\left(2+\cos\frac{\theta}{2}\cos\frac{3\theta}{2}\right)\\ \cos\frac{\theta}{2}\left(1-\sin\frac{\theta}{2}\sin\frac{3\theta}{2}\right)\\ \sin\frac{\theta}{2}\cos\frac{\theta}{2}\cos\frac{3\theta}{2}\end{bmatrix}+O\left(r^{-\frac{1}{2}}\right) \tag{17}$$

$$\begin{bmatrix}u_x\\ u_y\end{bmatrix}=\frac{K_{II}}{2\mu}\left(\frac{r}{2\pi}\right)^{\frac{1}{2}}\begin{bmatrix}\cos\frac{\theta}{2}\cdot\left(\kappa-1+2\sin^2\frac{\theta}{2}\right)\\ \sin\frac{\theta}{2}\cdot\left(\kappa+1-2\cos^2\frac{\theta}{2}\right)\end{bmatrix}+O\left(r^{\frac{3}{2}}\right) \tag{18}$$

In the above, which uses a polar coordinate system, r is the radius (length) of the virtual crack, θ is the angle of the virtual crack, κ=3−4v for plane strain conditions, and κ=(3−v)/(1+v) for plane stress conditions. The symbol 0 in Equations 15-18 above refers to the higher order terms of a series expansion, which can ignored because the higher order terms make negligible contributions to the overall result.

T is the "T-stress" value, which is a known metric for driving the fracture initiation event in brittle materials. The T-stress value T serves as a driving-force in extending the crack's displacement vector ($u_x$, $u_y$) in the xy-plane. The T-stress is formally defined as:

$$T\equiv\lim_{r\to 0}(\sigma_{xx}-\sigma_{yy}) \tag{19}$$

where $\sigma_{xx}$ and $\sigma_{yy}$ are taken from the current FEM stress field nearest the crack tip (e.g., the edge of the bond 26). A fitting operation is required to determine the $K_I$ and $K_{II}$ values at a given displacement point. This proceeds from the definition of the stress intensity factors:

$$\begin{bmatrix}K_I\\ K_{II}\end{bmatrix}=\lim_{r\to 0}\sqrt{2\pi r}\begin{bmatrix}\sigma_{yy}(r,\theta=0)\\ \sigma_{xy}(r,\theta=0)\end{bmatrix} \tag{20}$$

Therefore, taking the value of $\sigma_{yy}$(r, θ=0) or $\sigma_{xy}$ (r, θ=0) from the calculated stress field at a given virtual crack length a, the $K_I$ and $K_{II}$ values can be determined:

$$K_I=\sigma_{yy}\sqrt{\pi a}\cdot F\left(\frac{a}{b}\right) \tag{21}$$

$$\text{or } K_{II}=\sigma_{xy}\sqrt{\pi a}\cdot F\left(\frac{a}{L}\right)$$

where L is the sample length, b is the width 52 of the bonded substrates 12, 16, and F is a geometric factor defined as:

$$F\left(\frac{a}{L}\right)=1.122-0.231\left(\frac{a}{L}\right)+10.55\left(\frac{a}{L}\right)^2-21.71\left(\frac{a}{L}\right)^3+30.38\left(\frac{a}{L}\right)^4 \tag{22}$$

The crack propagates in direction θ, determined using the following expression:

$$\theta_I=2\tan^{-1}\left(\frac{\sqrt{K_I^2+8K_{II}^2}-K_I}{4K_{II}}\right) \tag{23}$$

Accordingly, the virtual crack length a can be varied and assumed to be the distance 46 (a*) at which a crack is formed, and the $K_I$ and $K_{II}$ values can be determined as explained. Having the $K_I$ and $K_{II}$ values at the assumed distance a=a*, the Griffith energy release rate (G) balances as:

$$\left(K_I^2+K_{II}^2\right)\cdot\left(1-\nu^2\right)=K_{IC}^2 \tag{24}$$

Thus, the effective fracture value $K_{IC}$ can be determined for any given distance 46 (a*), and a graph as illustrated at FIG. 9 can be formed.

It can be determined from these model-created graphs, such as at FIG. 9, or from the model computation directly, the range of strengths of the bonds 26 that the range of incident laser energy densities forms, from a minimum strength formed using the minimum incident laser energy density, to a maximum strength formed using the maximum incident laser energy density. For example, the bond 26 (having a particular width 30) created using the minimum incident laser energy density (here, specifically the minimum laser energy at constant laser speed and constant spot size) cracked at the maximum ("max") distance 46 (a*) identified in FIGS. 7 and 9. From the curve reproduced at FIG. 9, the effective fracture toughness ($K_{IC}$) of that bond 26 (created using the minimum incident laser energy density) can be determined, and is identified as the minimum ("min") effective fracture toughness ($K_{IC}$) at FIG. 9 of the bonds formed using the range of incident laser energy densities. Likewise, the bond 26 (having a particular width 30) created using the maximum incident laser energy density (here, specifically the maximum laser power at constant laser speed) cracked at the minimum ("min") distance 46 (a*) identified in FIGS. 7 and 9. From the curve reproduced at FIG. 9, the effective fracture toughness ($K_{IC}$) of that bond 26 (created by the maximum incident laser energy density) can be determined, and is identified as the maximum "max" effective fracture toughness ($K_{IC}$) at FIG. 9. Thus, the minimum incident laser energy density produces the bond 26 with the particular minimum effective fracture toughness ($K_{IC}$), and the maximum incident laser energy density produces the bond 26 with the particular maximum effective fracture toughness ($K_{IC}$). The range of strengths of the bonds 26 formed using the range of incident laser energy densities is thus determined, from the minimum strength formed using the minimum incident laser energy density and quantified as the minimum effective fracture toughness ($K_{IC}$), to the maximum strength formed using the maximum incident laser energy density and quantified as the maximum effective fracture toughness ($K_{IC}$).

The effective fracture toughness ($K_{IC}$) quantification of the strength of each bond 26 formed using each incident laser energy density within the range of incident laser energy densities can be determined in the same manner. In other words, each bond 26 fractured at a particular distance 46 (a*), and from each of those particular distances 46 (a*), a particular effective fracture toughness ($K_{IC}$) can be determined from the graph (e.g., FIG. 9) generated using the numerical model. In other words, each incident laser energy density produces a particular bond 26, and each bond 26 has a particular effective fracture toughness ($K_{IC}$), which quantifies the strength of that bond 26. Stated another way, each incident laser energy density from the minimum incident laser energy density to the maximum incident laser energy density produced a bond 26 that fractured at a particular distance 46 (a*) between the wedge 42 and the bond 26, and from that distance 46 (a*), the selected model can be used to calculate the effective fracture toughness ($K_{IC}$) of that bond 26.

It is worth noting again, as highlighted in the models presented above, that the effective fracture toughness ($K_{IC}$) is a function of the compositions of the bonded substrates 12, 16 (e.g., the Young's moduli of the substrates 12, 16 ($E_1$ and $E_2$), the Poisson ratios of the substrates 12, 16 ($v_1$ and $v_2$), and the shear moduli of the substrates ($\mu_1$ and $\mu_2$)). For reference, borosilicate glass compositions (such as BK7) have an effective fracture toughness ($K_{IC}$) value typically near 0.7 MPa·m½. Well separated bonds 26 made between layers of such glass have a lower effective fracture toughness ($K_{IC}$) value, typically within the range of 0.3 to 0.5 MPa·m½.

Figure 10:
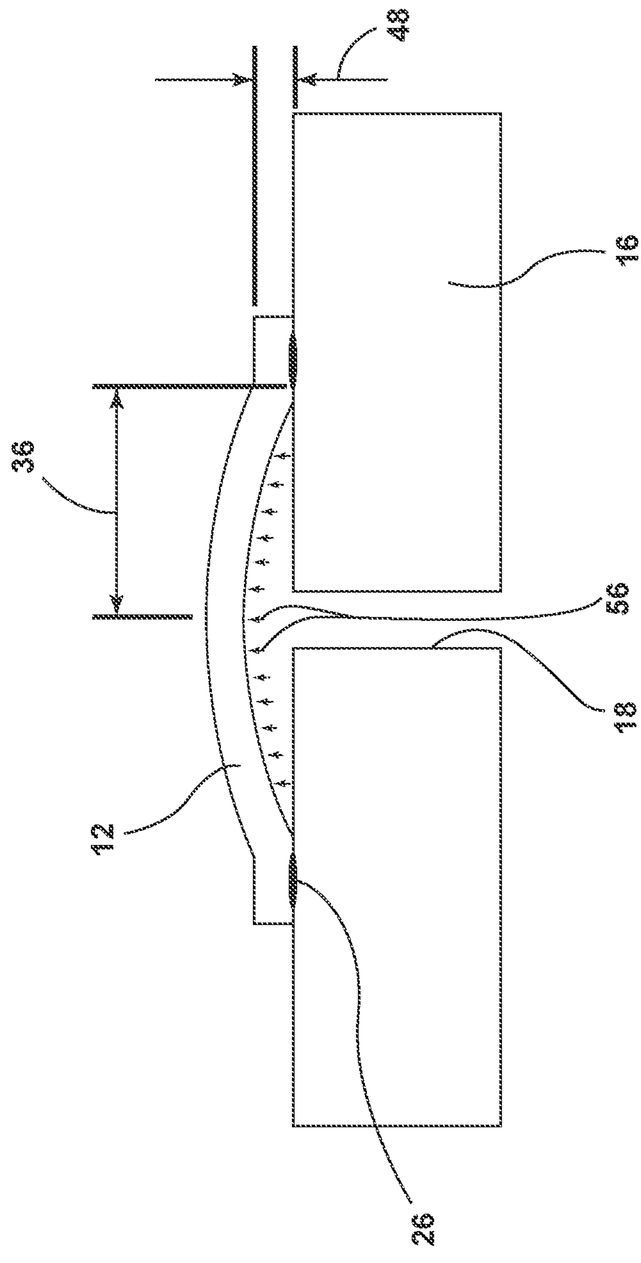
FIG. 10 is a cross-sectional schematic view to explain numerical modeling of some embodiments of the first substrate bonded to the second substrate with pressure applied to the first substrate through the through-hole of the second substrate.
Figure 11:
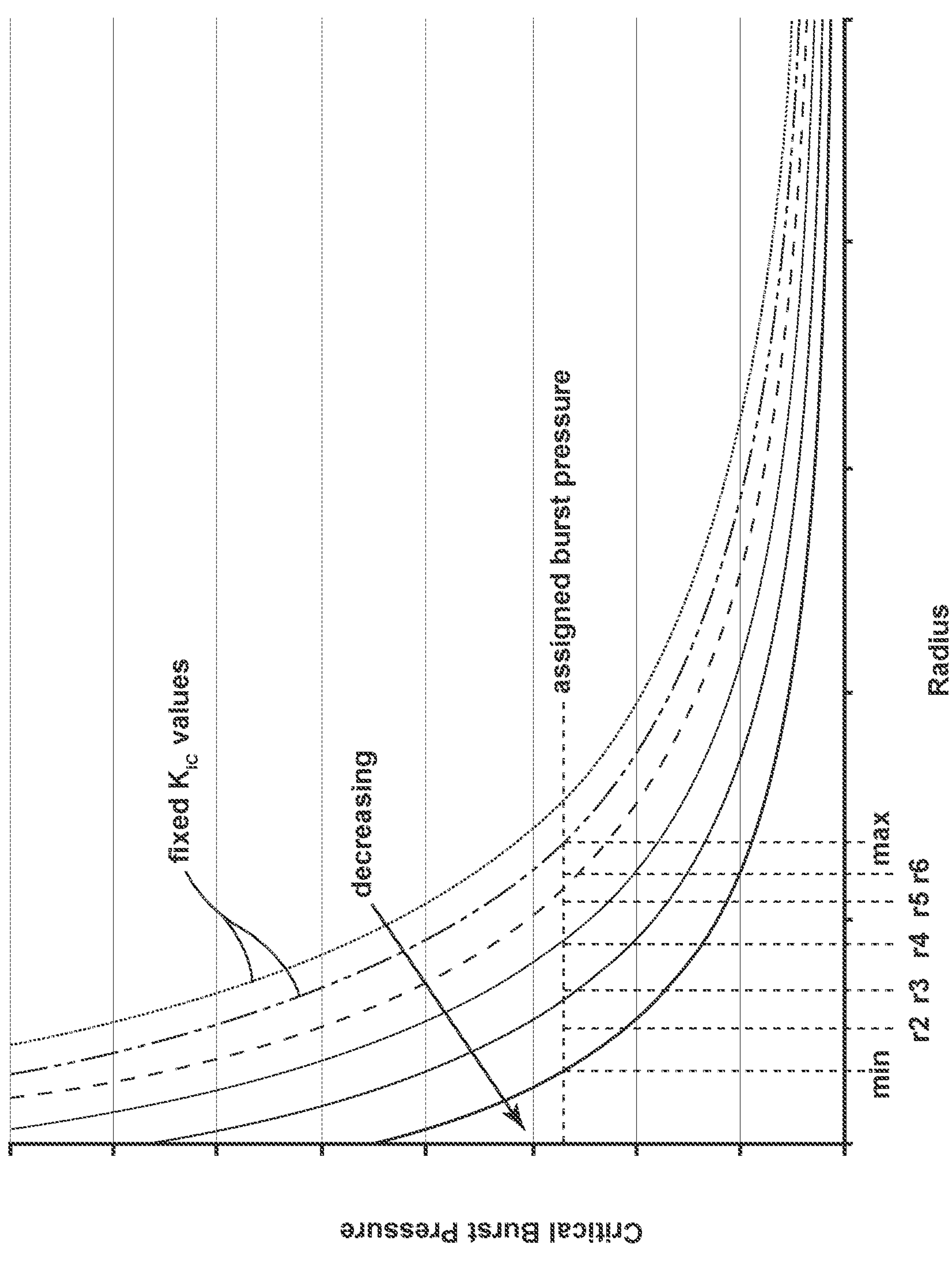
FIG. 11 is a graph produced from the numerically modeled scenario of FIG. 10, illustrating critical burst pressure (e.g., the pressure at which the bond between the first substrate and the second substrate breaks) as a function of the radius of the bond, for a variety of fixed effective fracture toughness ($K_{IC}$) values, illustrating that, for bonds of differing radii to burst at the same assigned burst pressure, the effective fracture toughness ($K_{IC}$) of the bonds must increase as a function of increasing radius of the bond.

E. Determine Range of Radii of the Bonds to Meet Minimum Burst Pressure. Referring now to FIGS. 10 and 11, in a step 54, the method 34 comprises determining a range of radii 36 for the bonds 26 as a function of the assigned minimum burst pressure 56 (from step 35) and the determined strengths of the bonds 26 (from step 44) from a minimum radius 36 of the innermost bond 26*a* to a maximum radius 36 of the outermost bond 26*b*. In embodiments, determining the range of radii 36 as a function of the determined strengths of the bonds 26 comprises determining the range of radii 36 for the bonds 26 as a function of the quantified effective fracture toughnesses ($K_{IC}$) of the bonds 26. In embodiments, determining the range of radii 36 comprises quantifying a pressure 56 at which each bond 26 would burst as a function of the radius 36 of the bond 26 for a range of effective fracture toughness ($K_{IC}$) values of the bond 26.

In embodiments, a numerical model is used to quantify the pressure 56 at which each bond 26 bursts as a function of a radius 36 of the bond 26 for the range of effective fracture toughnesses ($K_{IC}$) of the bond 26 quantified above. In embodiments, the numerical model considers different stress fields (e.g., more distributed) than the numerical model described above to determine effective fracture toughness ($K_{IC}$) of the bond 26 as a function of a distance 46 (a*). In embodiments, the model utilizes the following equation for the fluid pressure 56 at which the bond 26 will burst, which can be referred to as the "critical burst pressure" ($P_{burst}$):

$$P_{burst} = \left[\frac{32}{3(1-v^2)}\left(\frac{t_1}{r}\right)^3\right]^{\frac{1}{2}} \times \left(\frac{EK_{IC}}{r}\right)^{\frac{1}{2}} \quad (25)$$

where v is the Poisson's ratio of the first substrate 12, $t_1$ is the thickness 48 of the first substrate 12, E is the Young's modulus of the first substrate 12, r is the radius 36 of the bond 26, and $K_{IC}$ is the selected effective fracture toughness of the bond 26 for the numerical model. The above equation assumes an infinitely wide bond 26 between the first substrate 12 and the second substrate 14. In other embodiments, the step 54 utilizes a numerical model that accounts for the bond 26 having a defined width 30.

Note from the conceptual graph shown at FIG. 11 that as the radius 36 of the bond 26 decreases, for any given effective fracture toughness ($K_{IC}$), the higher the pressure 56 the bond 26 can withstand before the bond 26 breaks (i.e., the higher the burst pressure 56). In addition, note that to satisfy an assigned burst pressure 56 (e.g., as indicated by the horizontal dotted line), as the radius of the bond 26 increases, the effective fracture toughness ($K_{IC}$) of the bond 26 must additionally increase.

As described above, at step 38 of the method 34, the minimum incident laser energy density and the maximum incident laser energy density can be determined. In turn, embodiments of step 44 of the method 34 comprise quantifying a range of strength of those bonds 26 in terms of effective fracture toughness ($K_{IC}$) from the minimum fracture toughness ($K_{IC}$) to the maximum fracture toughness ($K_{IC}$) for the bonds 26 created using the minimum incident laser energy density and the maximum incident laser energy density, respectively. Using the minimum burst pressure from step 35, the minimum radius 36 and the maximum radius 36 of the bonds 26 can be determined from a graph akin to that shown at FIG. 11 or directly from the numerical model from which the graph was produced. For example, referring to FIG. 11, if the horizontal dotted line represents the assigned pressure 56 from step 35, then the horizontal dotted line intersects with the quantified minimum and maximum fracture toughnesses ($K_{IC}$) from step 44. The vertical dotted line "min" represents the minimum radius 36 where the horizontal dotted line intersects with the minimum fracture toughness values ($K_{IC}$) from step 54. The vertical dotted line "max" represents the maximum radius 36 where the horizontal dotted line intersects with the maximum fracture toughness values ($K_{IC}$) from step 54. In other words, if the bond 26 with the minimum radius 36 determined from this step 54 is formed with the minimum incident laser energy density from step 38, and the bond 26 with the maximum radius 36 determined from this step 54 is formed with the maximum incident laser energy density from step 38, then both bonds 26 will have the effective fracture toughness ($K_{IC}$) values to fail at the same fluid pressure 56 assigned at step 35. The range of the radii 36 of the bonds 26 for the device 10 is thus determined. The range of radii 36 determined at this step 54 represents the range of radii 36 of the bonds 26 that are designed to burst at the same pressure 56 assigned at step 35 and without causing the device 10 to fail at the first substrate 12 rather than at the bonds 26. The bond 26 formed at the minimum radius 36 (e.g., the innermost bond 26*a*) is formed with the minimum incident laser energy density and thus has the minimum strength (quantified as the minimum effective fracture toughness ($K_{IC}$)). In turn, the bond 26 formed at the maximum radius 36 (e.g., the outermost bond 26*b*) is formed with the maximum incident laser energy density and thus has the maximum strength (quantified as the maximum effective fracture toughness ($K_{IC}$)).

Note that the range of radii 36 is a function of the assigned pressure 56 from step 35 and the composition of the substrates 12, 16. For example, increasing the assigned pressure 56 at step 35, assuming constant minimum and maximum effective fracture toughness ($K_{IC}$) values, decreases the minimum and maximum radii 36 for the bonds 26 to achieve that assigned pressure 56. Similarly, if the compositions of the substrates 12, 16 are changed such that the resulting bonds 26 have an increased range of effective fracture toughness ($K_{IC}$) values, and the assigned pressure 56 remains the same, then the radii 36 defining the range of radii 36 for the bonds 26 increases.

As further elaborated upon below, each of the bonds 26 between the innermost bond 26*a* and the outermost bond 26*b* (e.g., the intermediate bonds 26) will have a strength (e.g., a quantified effective fracture toughness ($K_{IC}$)) that increases sequentially moving outward from the innermost bond 26*a* toward the outermost bond 26*b* so that each of the bonds 26 are designed to burst at the same pressure 56 assigned at step 35. Thus, in forming the bonds 26 with the laser, the incident laser energy density is sequentially increased for each bond 26 moving outward from the innermost bond 26*a* to sequentially increase the strength (e.g., the effective fracture toughness ($K_{IC}$)) of each successive bond 26 moving outward. For example, using constant laser speed, in forming the bonds 26 with the laser, the laser power is sequentially increased for each bond 26 moving outward from the innermost bond 26*a* to sequentially increase the strength (e.g., the effective fracture toughness ($K_{IC}$)) of each bond 26. Alternatively, using constant laser power, in forming the bonds 26 with the laser, the laser speed is sequentially decreased for each bond 26 moving outward from the innermost bond 26*a* to sequentially increase the strength (e.g., the effective fracture toughness ($K_{IC}$)) of each bond 26.

Figure 12:
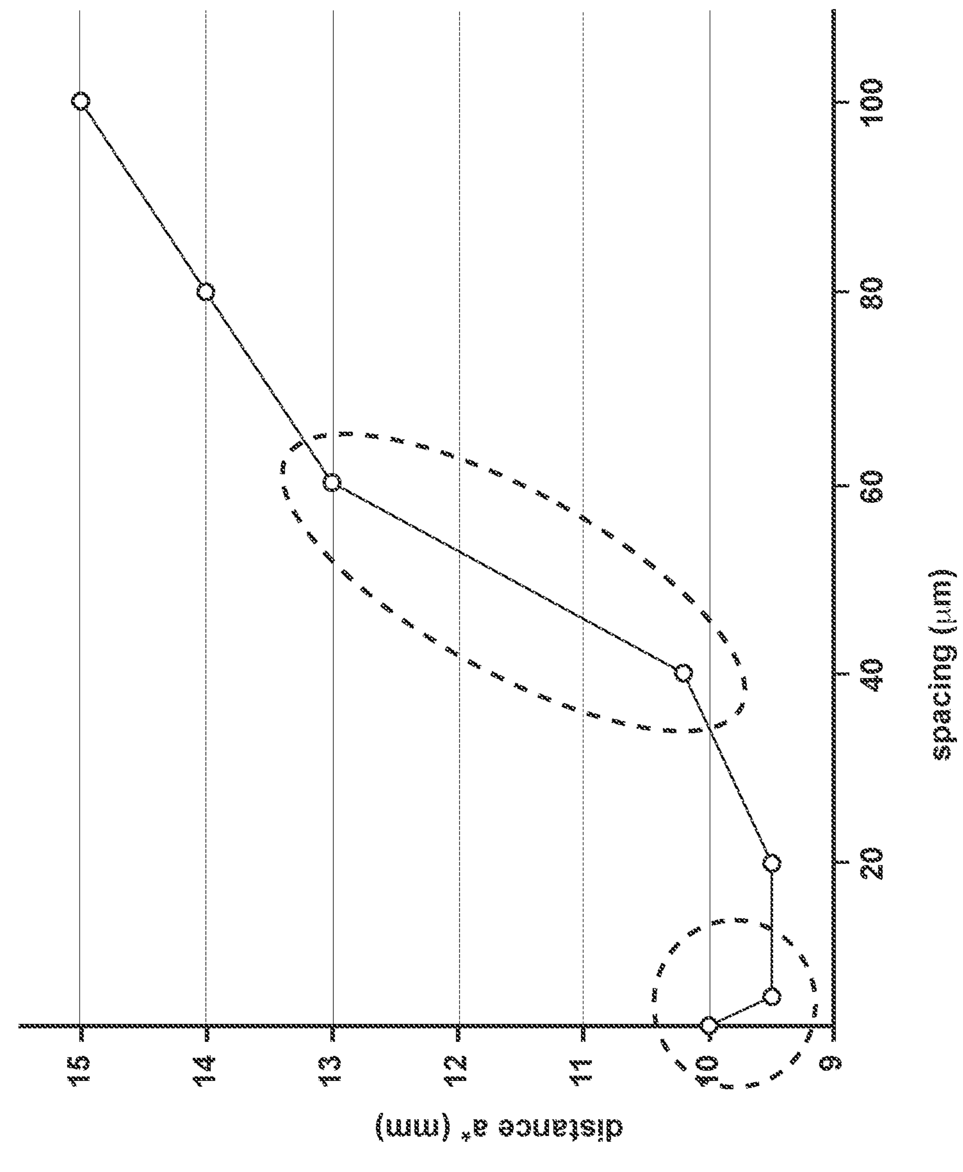
FIG. 12 is an experimentally determined graph of the distance between the wedge and the nearest bond of a series of bonds at which the bond fractures as a function of the spacing between the bonds in the series of bonds, illustrating that the distance decreases (and thus the bond strength increases) as the spacing decreases, up to a certain point.

F. Determine Number of and Spacing Between Bonds. Referring now to FIG. 12, in a step 58, the method 34 comprises determining the number of bonds 26, each bond 26 having equal width 30, and equal spacing 32 between adjacent bonds 26 so that the ratio of the spacing 32 to the width 30 of the bonds 26 is 1 to 5 (such as 1 to 3.5).

It has been discovered that, as the spacing 32 between the bonds 26 decreases, the bonds 26 appear to cooperate with each other to increase their respective strengths (e.g., effective fracture toughness ($K_{IC}$)) beyond the strength that each bond 26 would have if the bonds 26 were spaced farther apart. This concept is experimentally illustrated in the graph shown at FIG. 12, where the distance 46 (a*) (directly related to the strength of the bond 26) is plotted as a function of center-to-center spacing 32 between bonds 26. The experiments utilized samples incorporating a first substrate 12 with a thickness 48 of 500 μm and a second substrate 16 with a thickness 50 of 500 μm. Numerous bonds 26 between the first substrate 12 and the second substrate 16 were formed using a laser. The bonds 26 had a width 30 of about 15 μm. The center-to-center spacing 32 between the bonds 26 was constant for each individual sample but varied sample-to-sample over the range of 20 μm to 100 μm. All other laser conditions, such as laser power, laser speed, and spot size were constant. Note the significant transition in the distance 46 (a*) as the center-to-center spacing 32 between the bonds 26 decreases below 60 μm, with the inflection point somewhere around 50 μm (e.g., at a spacing-to-width ratio of about 3.5 (50 μm/15 μm≈3.5). The lower the distance 46 (a*), the higher the strength of the bond 26 (as quantified by the effective fracture toughnesses ($K_{IC}$)), as explained above. Without being bound by theory, it is believed that the residual stress fields of adjacent bonds 26 appreciably cooperate when the bonds 26 are spaced close enough together (such as at a ratio of 5 or less, or 3.5 or less). In other words, as the center-to-center spacing 32 between the bonds 26 decreases, the morphology of each bond 26 transitions from isolated compressive-tensile stresses to larger concatenated cooperative bond structures.

However, there is a limit—a minimum spacing 32 at which this cooperative effect occurs. Spacing the bonds 26 closer together than this minimum spacing 32 causes the strength of each bond 26 to decrease as the spacing 32 between the bonds 26 decreases. This can be seen in the rise in distance (a*) as the spacing 32 decreases lower than 5 μm and the inflection point at about 15 μm. For example, overwriting the bonds 26—that is, laser forming one bond 26 such that it overlaps another bond 26—results in no such cooperative effect to increase strength of each bond 26, or less of an increase in the strength of each bond 26 compared to bonds 26 with greater spacing 32. Without being bound by theory, it is thought that when the laser overwrites an already formed bond 26 to create a new bond 26 overlapping with the already formed bond 26, the laser damages the already formed bond 26 and thus reduces the strength of the already formed bond 26.

In embodiments, the center-to-center spacing 32 between the bonds 26 is a function of the width 30 of the bonds 26. In embodiments, the ratio of the spacing 32 to the width 30 is within the ranges of 1 to 5, 1 to 3.5, 1.5 to 2.5, 1.75 to 2.25, 1.75 to 3.5, about 2, or 2. It has been discovered that the above-described cooperative effects occur within the above ranges. Above the upper limit of 5, or even 3.5, the bonds 26 no longer cooperate to an extent to appreciably increase strength of each of the bonds 26. Below the lower limit of 1, the laser overwrites the bonds 26 causing internal damage that reduces the strengths of the bonds 26. In embodiments, the number of bonds 26 is at least 5.

G. Determine the Specific Radii for Each of the Bonds. In a step 60, the method 34 comprises determining the radius 36 for each bond 26 between the innermost bond 26*a* and the outermost bond 26*b* (i.e., the intermediate bonds 26). The range of radii 36 for the bonds 26 from the minimum radius 36 to the maximum radius 36 can be determined at the previous step 54, and the spacing 32 and number of bonds 26 can be determined at the previous step 58. Therefore, the specific radii 36 of all the intermediate bonds 26 can be determined by beginning with the minimum radius 36 and determining the next adjacent bond 26 as the minimum radius 36 plus the determined spacing 32, and so on up to the bond 26 before the outermost bond 26*b* at the maximum radius 36.

H. Determine Strength of Each Bond Between Innermost and Outermost Bonds as a Function of Determined Radii. In a step 62, the method 34 comprises determining the strength of each bond 26 between the innermost bond 26*a* and the outermost bond 26*b* (i.e., the intermediate bonds 26) as a function of the determined radius 36 for each of the bonds 26 between the innermost bond 26*a* and the outermost bond 26*b* (i.e., the intermediate bonds 26) (from step 60) and the assigned burst pressure 56 (from step 35).

In embodiments, determining the strength of each bond 26 between the innermost bond 26*a* and the outermost bond 26*b* as a function of the determined radius 36 for each of the bonds 26 comprises quantifying the effective fracture toughness ($K_{IC}$) for each bond 26 between the innermost bond 26*a* and the outermost bond 26*b* as a function of the determined radius 36 (from step 60) and the assigned burst pressure 56 (from step 35). In embodiments, the effective fracture toughness ($K_{IC}$) for each intermediate bond 26 between the innermost bond 26*a* and the outermost bond 26*b* is determined directly from the above numerical model as a function of the assigned burst pressure 56 and the determined radius 36.

In embodiments, the effective fracture toughness ($K_{IC}$) for each intermediate bond 26 between the innermost bond 26*a* and the outermost bond 26*b* is determined from interpolation of a graph (such as the graph of FIG. 11) that plots burst pressure 56 as a function of radius 36 for a variety of given effective fracture toughness ($K_{IC}$) values of the bond 26. For example, and referring to FIG. 11, assuming determined radii 36 of $r_2$ through $r_6$ between the minimum radius 36 and the maximum radius 36 at step 60, the effective fracture toughness ($K_{IC}$) of each intermediate bond 26 can be interpolated where the particular radius 36 intersects the burst pressure 56 assigned from step 35. The effective fracture toughness ($K_{IC}$) of each intermediate bond 26 increases as the radius 36 increases from the minimum radius 36 to the maximum radius 36.

J. Determine the Incident Laser Energy Density for Each Intermediate Bond. In a step 66, the method 34 comprises determining the incident laser energy density to be used in forming each intermediate bond 26 between the innermost bond 26*a* and the outermost bond 26*b* as a function of the determined strength for each bond 26 (from step 66). In embodiments, step 66 comprises determining the laser power (using constant laser speed and constant spot size), within the range of laser power, corresponding to each intermediate bond 26 as a function of the determined strength of each intermediate bond 26. In embodiments, step 66 comprises determining the laser speed (using constant laser power and constant spot size), within the range of laser speeds, corresponding to each intermediate bond 26 as a function of the determined strength of each intermediate bond 26.

i. Determine a Distance a* for Each Bond. In embodiments, determining the incident laser energy density to be used in forming each bond 26 between the innermost bond 26*a* and the outermost bond 26*b* comprises using the numerical model that quantifies the distance 46 (a*) at which the modeled wedge 42 causes the bond 26 to fracture as a function of effective fracture toughness ($K_{IC}$) of bonds to determine the distance 46 (a*) for each of the intermediate bonds 26 as a function of the effective fracture toughness ($K_{IC}$) for each intermediate bond 26 determined above. In embodiments, the distance 46 (a*) for each intermediate bond 26 between the innermost bond 26*a* and the outermost bond 26*b* is determined from a graph (such as the graph of FIG. 9) that plots the effective fracture toughness ($K_{IC}$) as a function of distance 46 (a*) for a given width 30 of the bond 26. For example, referring to FIG. 9, the effective fracture toughness ($K_{IC}$) for each intermediate bond 26 between the innermost bond 26*a* and the outermost bond 26*b* determined above intersects with the width 30 of the bond 26 at a particular distance 46 (a*), which is thus the determined distance 46 (a*) for that particular intermediate bond 26. That process is repeated for each effective fracture toughness ($K_{IC}$) for each intermediate bond 26 determined at step 62, resulting in a determined distance (a*) for each intermediate bond 26. Distance 46 (a*) a1, a2, a3, a4, and a5 correspond to effective fracture toughness ($K_{IC}$) values 1, 2, 3, 4, and 5, respectively, for each of the intermediate bonds 26.

ii. Determine the Incident Laser Energy Density from Experimental Plot of Distance a*as a Function of Incident Laser Energy Density. In embodiments, the incident laser energy density is determined from an experimental correlation of distance 46 (a*) as a function of incident laser energy density, as described above, such as from a graph (such as the graph of FIG. 7) that experimentally plots distance 46 (a*) as a function of incident laser energy density (specifically, there, the laser power at constant laser speed and spot size). Thus, the incident laser energy density (specifically, there, the laser power) for any given distance (a*) determined at step 66 can be determined from the graph. Distances 46 (a*) a1, a2, a3, a4, a5 intersect with the experimentally determined line at laser power LP1, LP2, LP3, LP4, and LP5, respectively.

K. Form the Bonds with the Determined Incident Laser Energies. In a step 68, the method 34 comprises forming the innermost bond 26*a* at the minimum radius 36 using the minimum incident laser energy density, the outermost bond 26*b* at the maximum radius using the maximum incident laser energy density, and each intermediate bond 26 at the determined radius using the determined incident laser energy density (from steps 60 and 66). As noted above, the incident laser energy density is sequentially increased for each bond 26 moving outward (away from the axis 24) from the innermost bond 26*a*. The innermost bond 26*a* is formed at the minimum radius 36 with the minimum incident laser energy density. The outermost bond 26*b* is formed at the maximum radius 36 with the maximum incident laser energy density. Each bond 26 has a strength, in embodiments quantified by the effective fracture toughness ($K_{IC}$), configured so that the bond 26 fails at the assigned burst pressure 56. The bonds 26 are concentric about the axis 24. The strengths of the bonds 26 sequentially increase from the innermost bond 26*a*, which has the minimum strength, to the outermost bond 26*b*, which has the maximum strength.

In embodiments, step 68 comprises forming the innermost bond 26*a* at the minimum radius 36 using the minimum laser power, the outermost bond 26*b* at the maximum radius using the maximum laser power, and each intermediate bond 26 at the determined radius using the determined laser power (from steps 60 and 66) (all at constant laser speed and spot size). As noted above, the laser power is sequentially increased for each bond 26 moving outward (away from the axis 24) from the innermost bond 26*a*. The innermost bond 26*a* is formed at the minimum radius 36 with the minimum laser power. The outermost bond 26*b* is formed at the maximum radius 36 with the maximum laser power. Each bond 26 has a strength, in embodiments quantified by the effective fracture toughness ($K_{IC}$), configured so that the bond 26 fails at the assigned burst pressure 56. The bonds 26 are concentric about the axis 24. The strengths of the bonds 26 sequentially increase from the innermost bond 26*a*, which has the minimum strength, to the outermost bond 26*b*, which has the maximum strength.

In embodiments, step 68 comprises forming the innermost bond 26*a* at the minimum radius 36 using the maximum laser speed, the outermost bond 26*b* at the maximum radius using the minimum laser speed, and each intermediate bond 26 at the determined radius using the determined laser speed (from steps 60 and 66) (all at constant laser power and constant spot size). As noted above, the laser speed is sequentially decreased for each bond 26 moving outward (away from the axis 24) from the innermost bond 26*a*. The innermost bond 26*a* is formed at the minimum radius 36 with the maximum laser speed. The outermost bond 26*b* is formed at the maximum radius 36 with the minimum laser speed. Each bond 26 has a strength, in embodiments quantified by the effective fracture toughness ($K_{IC}$), configured so that the bond 26 fails at the assigned burst pressure 56. The bonds 26 are concentric about the axis 24. The strengths of the bonds 26 sequentially increase from the innermost bond 26*a*, which has the minimum strength, to the outermost bond 26*b*, which has the maximum strength.

Some devices such as liquid lenses are manufactured by forming concentric bonds using constant incident laser energy density (e.g., using both constant laser power and constant laser speed), with as many concentric bonds as possible being formed within a given space. That can result in a waste of electricity and/or time, because only the innermost bond of the manufactured liquid lens is consequential to resisting fluid pressure. If the fluid pressure is enough to cause the innermost bond to fail, then the fluid pressure is enough to cause all the concentric bonds to fail, which results in failure of the liquid lens. Thus, the electricity and time spent in forming the remaining bonds may not be entirely beneficial. The present method 34 can enable formation of a limited number of bonds 26, each of which is designed to fail at the assigned burst pressure 56, which can be more economical in terms of time and electricity.

II. THE DEVICE

The device 10 (such as a liquid lens) manufactured using the method 34 can exhibit a variety of improved properties. First, each concentric bond 26 of the device 10 has a strength (e.g., an effective fracture toughness ($K_{IC}$)) that is sufficiently low that the bonds 26 fail in response to elevated fluid pressure 56 instead of the first substrate 12. Failure of the first substrate 12 results in failure of the device 10. Failure of the innermost bond 26*a* (and any subsequent bond 26 except for the outermost bond 26*b*) may not result in failure of the device 10, because at least one bond 26 remains to seal the liquid 22 within the cavity 20. This aspect is particularly important in embodiments where each of the first substrate 12 and the second substrate 16 have relatively high coefficients of thermal expansion (e.g., greater than about 5 ppm/° C.), because the width 30 of the bonds 26 is typically narrow, resulting in more bonds 26 being used. In contrast, when liquid lenses made to have as high an effective fracture toughness ($K_{IC}$) as possible are exposed to increased fluid pressure, the first substrate can fail instead of the bonds, resulting in failure of the entire liquid lens. "Coefficient of thermal expansion" is the linear expansion of the substrate averaged over a temperature range from about 20° C. to about 300° C. The coefficient of thermal expansion can be determined, for example, using the procedure described in ASTM E228 "Standard Test Method for Linear Thermal Expansion of Solid Materials With a Push-Rod Dilatometer."

Second, the strength (e.g., the effective fracture toughness ($K_{IC}$)) of each bond 26 sequentially increases outward from the innermost bond 26*a* to the outermost bond 26*b*. Each of the bonds 26 has a different toughness (e.g., effective fracture toughness ($K_{IC}$)). The innermost bond 26*a* is the weakest (e.g., the smallest effective fracture toughness ($K_{IC}$)). The outermost bond 26*b* is the strongest (e.g., the largest effective fracture toughness ($K_{IC}$)). In contrast, liquid lenses manufactured using other methods can result in all the bonds having the same strength (e.g., the same effective fracture toughness ($K_{IC}$))—a consequence of using the same incident laser energy density to form each of the bonds.

Third, each bond 26 of the device 10 is configured to fail at the same fluid pressure 56. Thus, if the fluid pressure 56 is temporarily at a level that causes the innermost bond 26*a* to fail, the failure of the innermost bond 26*a* increases the volume that the liquid 22 occupies and thus decreases the fluid pressure 56 exerted by the liquid 22 so that the next bond 26 remains intact to resist the fluid pressure 56, and so on toward the outermost bond 26*b*. In other words, the resistance to the assigned burst pressure is distributed throughout all the bonds 26. In contrast, in liquid lenses in which all the bonds are formed with the same incident laser energy density, all the bonds have the same effective fracture toughness ($K_{IC}$). Because burst pressure is inversely proportional to the square of the radius of the bond (see equation 25 above) assuming the same effective fracture toughness ($K_{IC}$) for all bonds, if the fluid pressure is sufficient to cause the innermost bond to fail, then the fluid pressure is likely sufficient to cause all the concentric bonds to fail and the liquid lens to fail. The device 10 of the present disclosure avoids such catastrophic failure by distributing resistance to the burst pressure 56 throughout all of the bonds 26, which have sequentially increasing effective fracture toughness ($K_{IC}$) values from the innermost bond 26*a* to the outermost bond 26*b*. The radius 36 and the strength of each bond 26 are cooperatively configured such that each bond 26 is to fail at the same pressure 56 or at least approximately the same pressure 56 (e.g., an average pressure 56 is calculated from the pressures 56 at which each bond 26 fails and each pressure 56 deviates from the average pressure 56 by at most 10 percent) exerted upon the first substrate 12 by the liquid 22. In embodiments, the pressure 56 at which the bonds 26 fail is 1 MPa to 3 MPa.

Fourth, the spacing 32 between the bonds 26 of the device 10 is optimized with a spacing-to-width ratio within the range of 1 to 5, such as 1 to 3.5, 1.5 to 3, 2 to 2.5, 1.75 to 2.25, and 1.75 to 3.5. With such spacing 32, the stress fields cooperate to increase the effective fracture toughness ($K_{IC}$) of each bond 26 above the designed effective fracture toughness ($K_{IC}$) and, thus, the fluid pressure 56 at which each bond 26 would actually burst is above the assigned fluid pressure 56. This leads to a more robust device 10. In contrast, liquid lenses formed using other manufacturing processes typically include as many bonds as space allows, and the bonds are spaced as close as possible, even overwriting adjacent bonds. This scheme, as explained above, reduces the effective fracture toughness ($K_{IC}$) of each overwritten bond. It is worth noting that the spacing-to-width ratio within the range of 1 to 5 (such as 1 to 3.5) raising the effective fracture toughness (($K_{IC}$) above the designed effective fracture toughness ($K_{IC}$) for the individual bonds 26 is unlikely to result in failure of the first substrate 12 rather than any given bond 26 except for the outermost bond 26*b*. And failure of the outermost bond 26*b* is of no consequence because failure of the outermost bond 26*b* assumes failure of every other bond 26 and, thus, would result in failure of the device 10 anyway. In embodiments, the widths 30 of the bonds 26 are equal or at least approximately equal (e.g., an average width 30 is calculated from the widths 30 and each width 30 deviates from the average width 30 by at most 10 percent). In embodiments, each pair of adjacent bonds 26 is separated by the same spacing 32 or approximately the same spacing 32 (e.g., an average spacing 32 is calculated from the spacings 32 and each spacing 32 deviates from the average spacing 32 by at most 10 percent).

III. EXAMPLE

Referring now to FIGS. 13-17, an example of a device 10 prepared pursuant to the method 34 is described. To perform steps 38 and 44 of the method 34, samples of the first substrate 12 having a thickness 48 of 500 μm, and samples of the second substrate 16 having a thickness 50 of 500 μm, were prepared. The samples of the first substrate 12 and the second substrate 16 had a composition of BK7, a high-purity borosilicate glass distributed by Schott AG (Mainz, Germany). Laser absorbing interfacial films consisting of 50 nm chromium oxynitride and 150 nm chromium metal were disposed between the first substrate 12 and the second substrate 16. The laser selected for the method 34 was a 355 nm pulsed ultraviolet (UV) laser configured to have 50 mm per second laser speed, 15 μm spot size, 80 kHz repetition rate, and 10 ns pulse widths. Thus, the incident laser energy density is to be varied by varying the laser power and maintaining laser speed and spot size constant.

In preparation to perform step 38 of the method 34, samples of the first substrate 12 and the second substrate 16 were stacked together and the laser was used to attempt to bond the two substrates 12, 16 together with a series 40 of fifty (50) individual straight bonds 26 having a width of 15 μm and separated by a spacing 32 of 100 μm. The spacing 32 of 100 μm is too wide for the stress fields of the bonds 26 to cooperate as detailed above to appreciably elevate the effective fracture toughness ($K_{IC}$) of each bond 26. Pursuant to step 38 of the method 34, the laser power of the laser was set successively higher for each sample of the first substrate 12 and the second substrate 16 stacked together, with the laser power ranging from 0.45 W to 1.1 W, with the other laser parameters remaining the same including laser speed and spot size, in order to vary incident laser energy density. The minimum laser power that resulted in formation of a bond 26 between the first substrate 12 and the second substrate 16 was identified as 0.52 W.

Pursuant to steps 38 and 44 of the method 34, an experiment including the wedge 42 as described above was performed on each sample of the bonded first substrate 12 and the second substrate 16. More specifically, the samples were placed in the field of view of a camera. A flat razor blade (Lutz Blades, Germany #60.15-0.14 mm thick) representing the wedge 42 was inserted into the gap between the first substrate 12 and the second substrate 16. A plunger-style digital micrometer (Mitutoyo, Japan MHD-2" MB—164-164) was then used to translate the flat razor blade (e.g., the wedge 42) slowly toward the series 40 of bonds 26, at a rate of about 1 mm per minute while monitoring signs of incipient crack formation at the closest bond 26 or at the first substrate 12 with a camera.

The maximum laser power that formed the bond 26 that fractured at the bond 26 in response to the wedge 42 rather than at the first substrate 12 was determined to be 0.9 W. The maximum laser power of the range of laser power determined pursuant to step 38 is thus 0.9 W. The range of laser power via step 38 is thus 0.52 W to 0.9 W. This is the range of laser power that will be utilized to manufacture a device 10 pursuant to the method 34 using the selected 355 nm wavelength laser.

Figure 13:
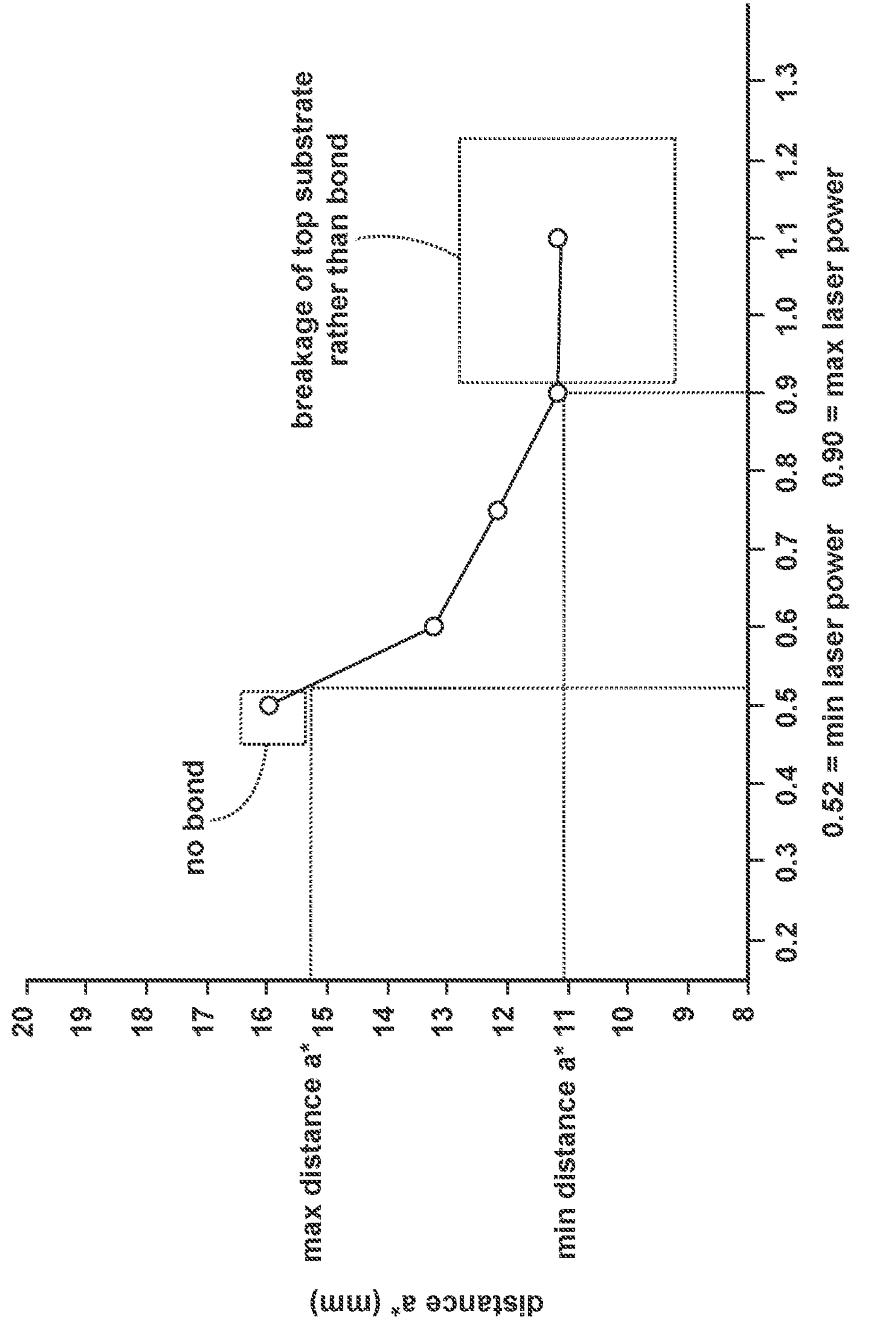
FIG. 13 is an experimentally determined graph of the distance between the wedge and the nearest bond of a series of bonds created by a laser as a function of the incident laser energy density (here, specifically laser power in Watts at a constant laser speed and spot size), illustrating that the minimum incident laser energy density (i.e., the minimum laser power) provides the maximum distance, and the maximum incident laser energy density (i.e., the maximum laser power) provides the minimum distance.

The graph reproduced at FIG. 13 was prepared to plot the distance 46 (a*) as a function of laser power over the range of laser power. The range of distances 46 (a*) at which the bond 26 fractured was determined to be about 11 mm (associated with the maximum laser power of 0.9 W) to about 15 mm (associated with the minimum laser power of 0.52 W). The range of distances 46 (a*) is thus about 11 mm to about 15 mm. Note that the distance 46 (a*) from the bond 26 at which the wedge 42 fractures the bond 26 is a function of the laser power that formed that bond 26.

A numerical model was used to determine the effective fracture toughness ($K_{IC}$) as a function of the distance 46 (a*) at which a modeled wedge 42 having a thickness (A) of 0.14 mm causes the bond 26 to fracture. The model assumed that the width 30 of the bond 26 was 0.01 mm. The model, an FEM model, generated the graph at FIG. 14. The graph reveals that the bond 26 formed by the maximum laser power of 0.9 W and that fractured at the minimum distance (a*) of about 11 mm has an effective fracture toughness ($K_{IC}$) of 0.55 MPa·m½. In addition, the graph reveals that the bond 26 formed by the minimum laser power of 0.52 W and that fractured at the maximum distance (a*) of about 15 mm has an effective fracture toughness ($K_{IC}$) of 0.31 MPa·m½. Thus, the bonds 26 of the device 10 manufactured via the method 34 will be formed from laser powers ranging from 0.52 W to 0.9 W and are designed to have an effective fracture toughness ($K_{IC}$) ranging from 0.31 MPa·m½ to 0.55 MPa·m½.

Pursuant to the step 35 of the method 34, a minimum burst pressure of 300 psi (≈2.1 MPa) is assigned. This is the minimum fluid pressure 56 exerted by the liquid 22 at which the device 10 is designed to fail.

Pursuant to the step 54 of the method 34, the range of radii 36 for the bonds 26 to meet the assigned minimum burst pressure of 300 psi (≈2.1 MPa) as a function of the range of effective fracture toughness ($K_{IC}$) values was determined. More specifically, a numerical model was used to quantify the pressure 56 at which a bond 26 would burst as a function of a radius 36 of the bond 26 for a range of effective fracture toughness ($K_{IC}$) values of the bond 26. The result of the numerical model is the graph reproduced at FIG. 15. The horizontal dotted line is the assigned burst pressure of 300 psi (≈2.1 MPa). The horizontal line intersects with the interpolated minimum effective fracture toughness ($K_{IC}$) of 0.31 MPa·m½ (between the lines of 0.3 MPa·m½ and 0.4 MPa·m½) at a minimum radius 36 of 0.75 mm. In addition, the horizontal line intersects with the interpolated maximum effective fracture toughness ($K_{IC}$) of 0.55 MPa·m½ (between the lines of 0.5 and MPa·m½ and 0.6 MPa·m½) at a maximum radius 36 of 1.04 mm. Instead of interpolating using the graph of FIG. 15, the numerical model could have been utilized to determine the minimum radius 36 and the maximum radius 36 directly as a function of the assigned burst pressure and the known values for minimum effective fracture toughness ($K_{IC}$) and maximum effective fracture toughness ($K_{IC}$). The radii 36 of the concentric bonds 26 of the device 10 formed pursuant to the method 34 will thus be within the range of 0.75 mm to 1.04 mm. More specifically, the laser will be used to form the innermost bond **26*a* at a radius 36 of 0.75 mm and with a laser power of 0.52 W so that the innermost bond 26*a* will have an effective fracture toughness ($K_{IC}$) of 0.31 MPa·m½, and the outermost bond 26*b* at a radius 36 of 1.04 mm and with a laser power of 0.90 W so that the outermost bond 26*b* will have an effective fracture toughness ($K_{IC}$) of 0.55 MPa·m½. Both the innermost bond 26*a* and the outermost bond 26*b* have been designed to fail at the same assigned burst pressure of 300 psi (≈2.1 MPa). Note that any radius 36 larger than 1.04 mm would have an effective fracture toughness ($K_{IC}$) exceeding the maximum of 0.55 MPa·m½, which would thus cause fracture of the first substrate 12 rather than the outermost bond 26*b* in response to the assigned burst pressure 56 of 300 psi (≈2.1 MPa). Any radius 36 smaller than 0.75 mm would have an effective fracture toughness ($K_{IC}$) below 0.31 MPa·m½, which would correspond to a laser power below 0.52 W, which would be insufficient to form a bond 26 between the first substrate 12 and the second substrate 16. Any desire to increase the laser power above 0.52 W at the innermost bond 26*a* or at a smaller radius 36 would result in the innermost bond 26*a* failing above the burst pressure 56 assigned at step 35, which renders the remainder of the bonds 26 essentially prone to failure as well (because any pressure 56 sufficient to cause the innermost bond 26*a* to fail would also cause every other bond 26 to fail, because those other bonds 26 are designed to fail at a lower pressure 56). It is to the intermediate bonds 26 between the innermost bond 26*a* and the outermost bond 26*b*** that this example now turns.

Pursuant to step 58 of the method 34, the number of, and spacing 32 between, the bonds 26 was determined. As explained, the effective fracture toughness ($K_{IC}$) of the bonds 26 is enhanced above design values if the spacing-to-width ratio of the bonds 26 is between 1 and 3.5. As mentioned, the bonds 26 have a width 30 of 15 μm, and radii 36 spanning a range of 0.29 mm (290 μm) from 0.75 mm to 1.04 mm. A spacing 32 of 29 μm would allow for eleven (11) bonds 26 and a spacing-to-width ratio of 1.93 (e.g., 29 μm/15 μm=1.93), which is within the desired range of 1 to 5 (and even 1 to 3.5, and 1.75 to 2.25).

Pursuant to step 60 of the method 34, the radius 36 for each intermediate bond 26 (i.e., those bonds 26 between the innermost bond 26*a* and the outermost bond 26*b*) was determined. With the spacing 32 between the bonds 26 already determined, the bonds 26 accordingly will have the following radii 36:

| Bond | Radius (mm) |
|---|---|
| 1 (innermost) | 0.75 |
| 2 | ~0.78 |
| 3 | ~0.81 |
| 4 | ~0.84 |
| 5 | ~0.87 |
| 6 | ~0.90 |
| 7 | ~0.92 |
| 8 | ~0.95 |
| 9 | ~0.98 |
| 10 | ~1.01 |
| 11 (outermost) | 1.04 |

Figure 16:
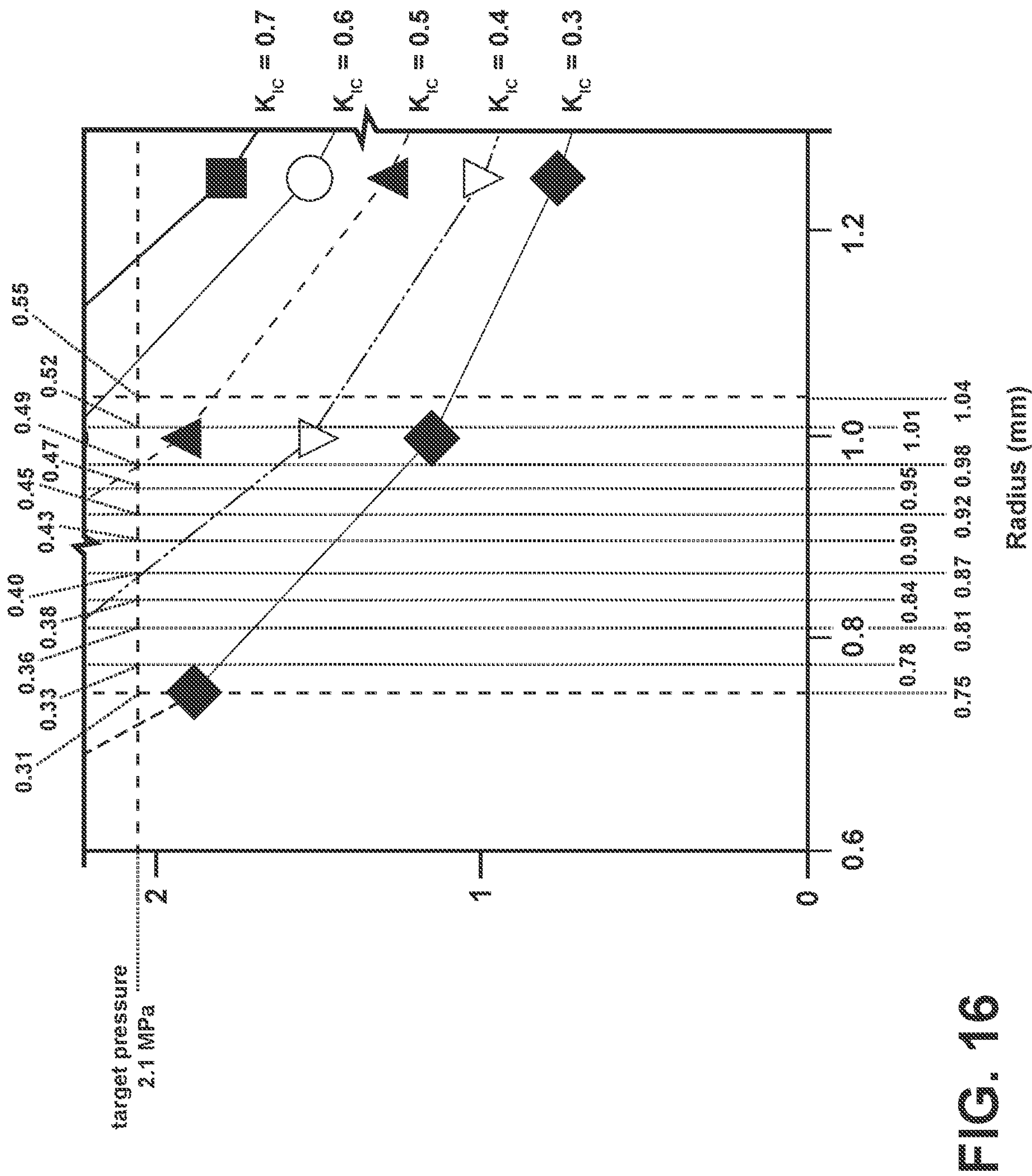
FIG. 16 is a magnified portion of the graph of FIG. 15, illustrating the radii for each of the bonds of the device of FIG. 1 so that bonds have a spacing-to-width ratio between 1 and 5 (such as between 1 and 3.5), and the effective fracture toughness ($K_{IC}$) values that each bond must have to burst at the same assigned burst pressure.

Pursuant to step 62 of the method 34, the effective fracture toughness ($K_{IC}$) for each intermediate bond 26 between the innermost bond 26*a* and the outermost bond 26*b* was determined as a function of the determined radius 36 and the assigned burst pressure 56. Referring now to FIG. 16, which is a magnified portion from FIG. 15, the vertical lines for the radii 36 of bonds 26 numbered 2 through 10 (i.e., the intermediate bonds 26) are added between the radii 36 of the innermost bond 26*a* and the outermost bond 26*b*. The vertical lines all intersect with the assigned target pressure 56 of 2.1 MPa (≈300 psi). Interpolating between the effective fracture toughness ($K_{IC}$) values on the graph, the vertical radii 36 lines intersect with the horizontal line for the assigned burst pressure 56 at the following values:

| Bond | Radius (mm) | $K_{IC}$ (MPa · m½) |
|---|---|---|
| 1 (innermost) | 0.75 | 0.31 |
| 2 | ~0.78 | 0.33 |
| 3 | ~0.81 | 0.36 |
| 4 | ~0.84 | 0.38 |
| 5 | ~0.87 | 0.40 |
| 6 | ~0.90 | 0.43 |
| 7 | ~0.92 | 0.45 |
| 8 | ~0.95 | 0.47 |
| 9 | ~0.98 | 0.49 |
| 10 | ~1.01 | 0.52 |
| 11 (outermost) | 1.04 | 0.55 |

Instead of using the graph of FIG. 16, the numerical model could have been utilized to determine directly the effective fracture toughness ($K_{IC}$) for each intermediate bond 26.

Figure 14:
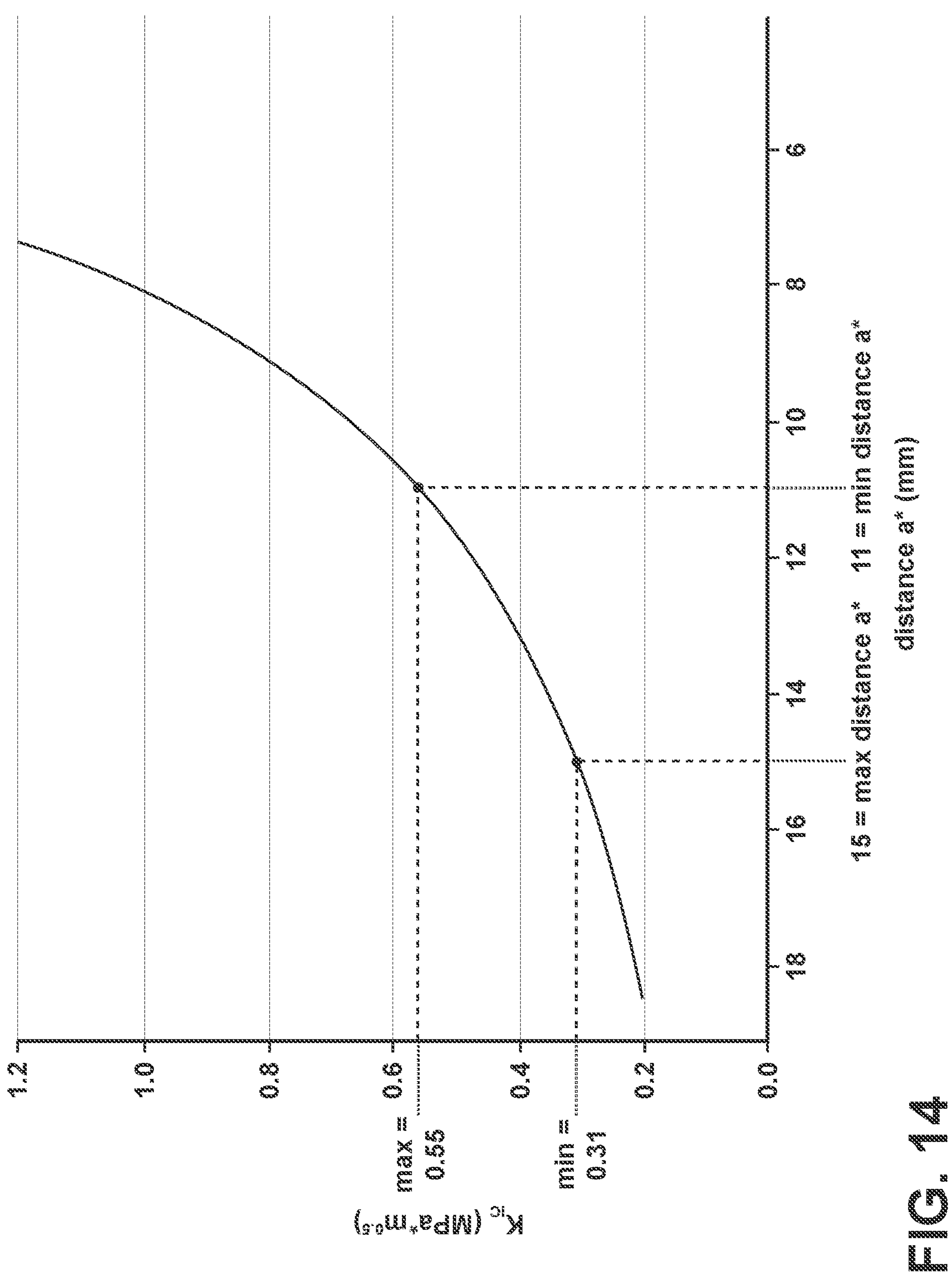
FIG. 14 is a numerically modeled graph of the effective facture toughness ($K_{IC}$) of the bond as a function of the distance between the wedge and the bond at which the bond fractures, illustrating that the minimum distance from FIG. 13 provides the maximum effective facture toughness ($K_{IC}$), and the maximum distance from FIG. 13 provides the minimum effective facture toughness ($K_{IC}$)
Figure 15:
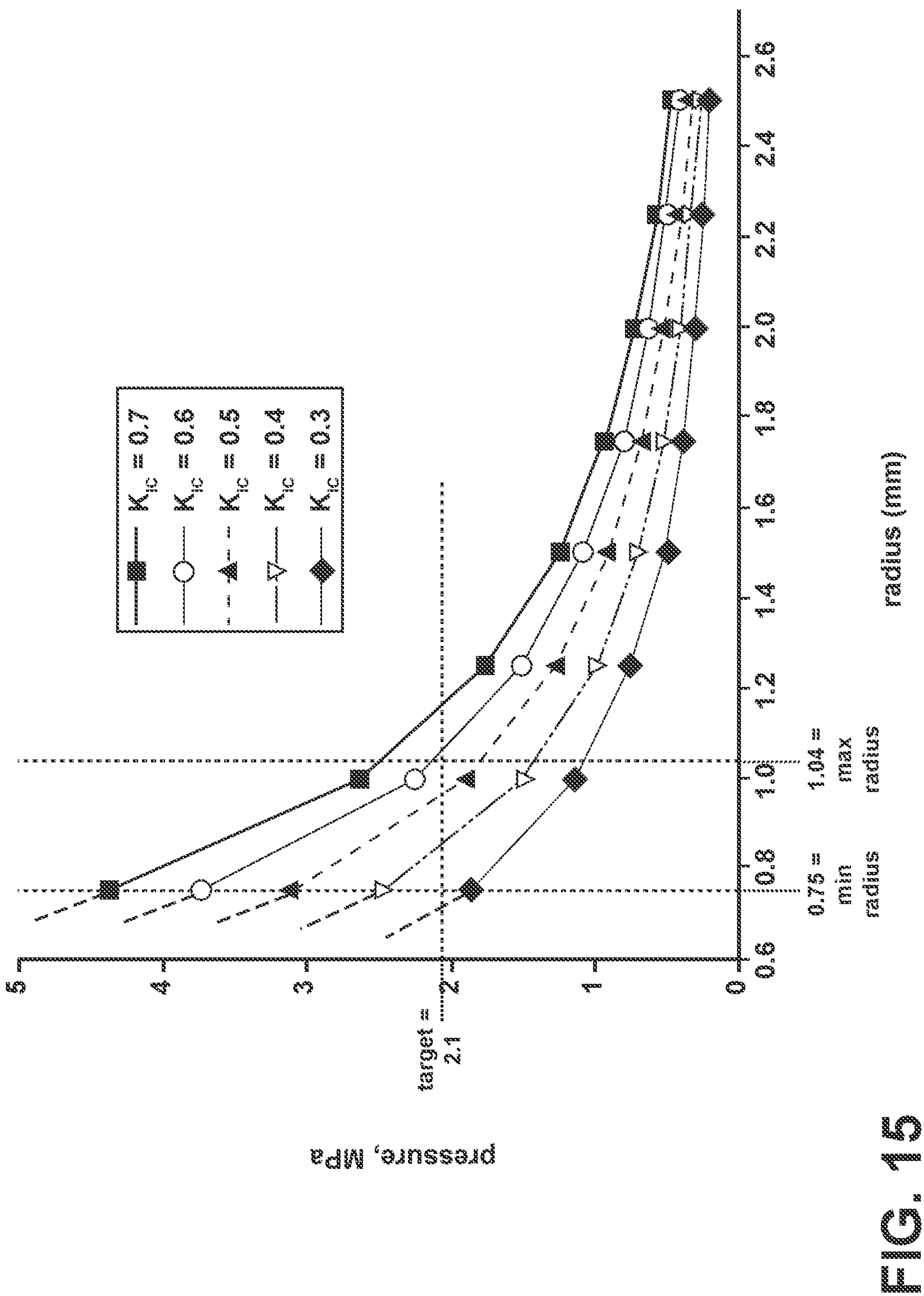
FIG. 15 is a numerically modeled graph of burst pressure as a function of radius of the bond for a variety of fixed effective facture toughness ($K_{IC}$) values, illustrating that, assuming an assigned burst pressure, the minimum effective facture toughness ($K_{IC}$) value from FIG. 14 provides a minimum radius value (e.g., the radius of the innermost bond of the device of FIG. 1), and the maximum effective fracture toughness ($K_{IC}$) value from FIG. 14 provides a maximum radius value (e.g., the radius of the outermost bond of the device of FIG. 1)
Figure 17:
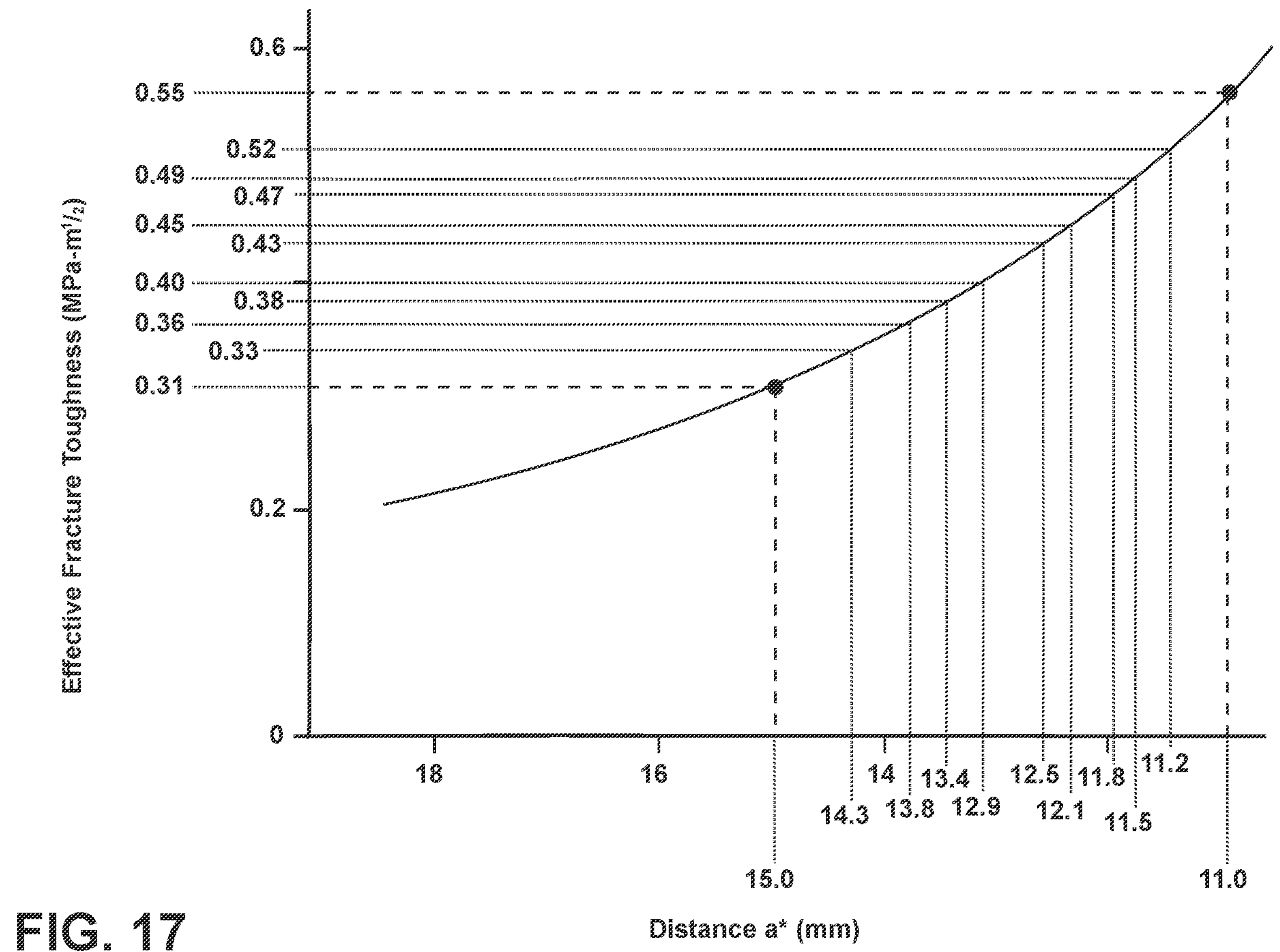
FIG. 17 is a magnified portion of the graph of FIG. 14, illustrating distance values for each of the bonds of the device of FIG. 1 as a function of the effective fracture toughness ($K_{IC}$) values obtained from FIG. 16.

The distance 46 (a*) for each intermediate bond 26 between the innermost bond 26*a* and the outermost bond 26*b* as a function of the determined effective fracture toughness ($K_{IC}$) values and the assigned burst pressures 56 was determined from the graph of FIG. 17, which is a magnified portion of the graph of FIG. 14. The graph of FIG. 17 plots the effective fracture toughness ($K_{IC}$) as a function of distance 46 (a*) for a given width of the bond 26. The horizontal lines representing the effective fracture toughness ($K_{IC}$) values for each of the intermediate bonds 26 determined above intersect with the curved line, and then vertical lines are drawn down to the distance 46 (a*) axis. The value for the effective fracture toughness ($K_{IC}$) of each intermediate bond 26 thus is assigned a distance 46 (a*) value. Therefore, the bonds 26 have the following distance 46 (a*) values:

| Bond | Radius (mm) | $K_{IC}$ (MPa · m½) | a* (mm) |
|---|---|---|---|
| 1 (innermost) | 0.75 | 0.31 | 15.0 |
| 2 | ~0.78 | 0.33 | 14.3 |
| 3 | ~0.81 | 0.36 | 13.8 |
| 4 | ~0.84 | 0.38 | 13.4 |
| 5 | ~0.87 | 0.40 | 12.9 |
| 6 | ~0.90 | 0.43 | 12.5 |
| 7 | ~0.92 | 0.45 | 12.1 |
| 8 | ~0.95 | 0.47 | 11.8 |
| 9 | ~0.98 | 0.49 | 11.5 |
| 10 | ~1.01 | 0.52 | 11.2 |
| 11 (outermost) | 1.04 | 0.55 | 11.0 |

Instead of using the graph of FIG. 17, the numerical model could have been utilized to determine the distance 46 (a*) directly for each intermediate bond 26 between the innermost bond 26*a* and the outermost bond 26*b*.

Figure 18:
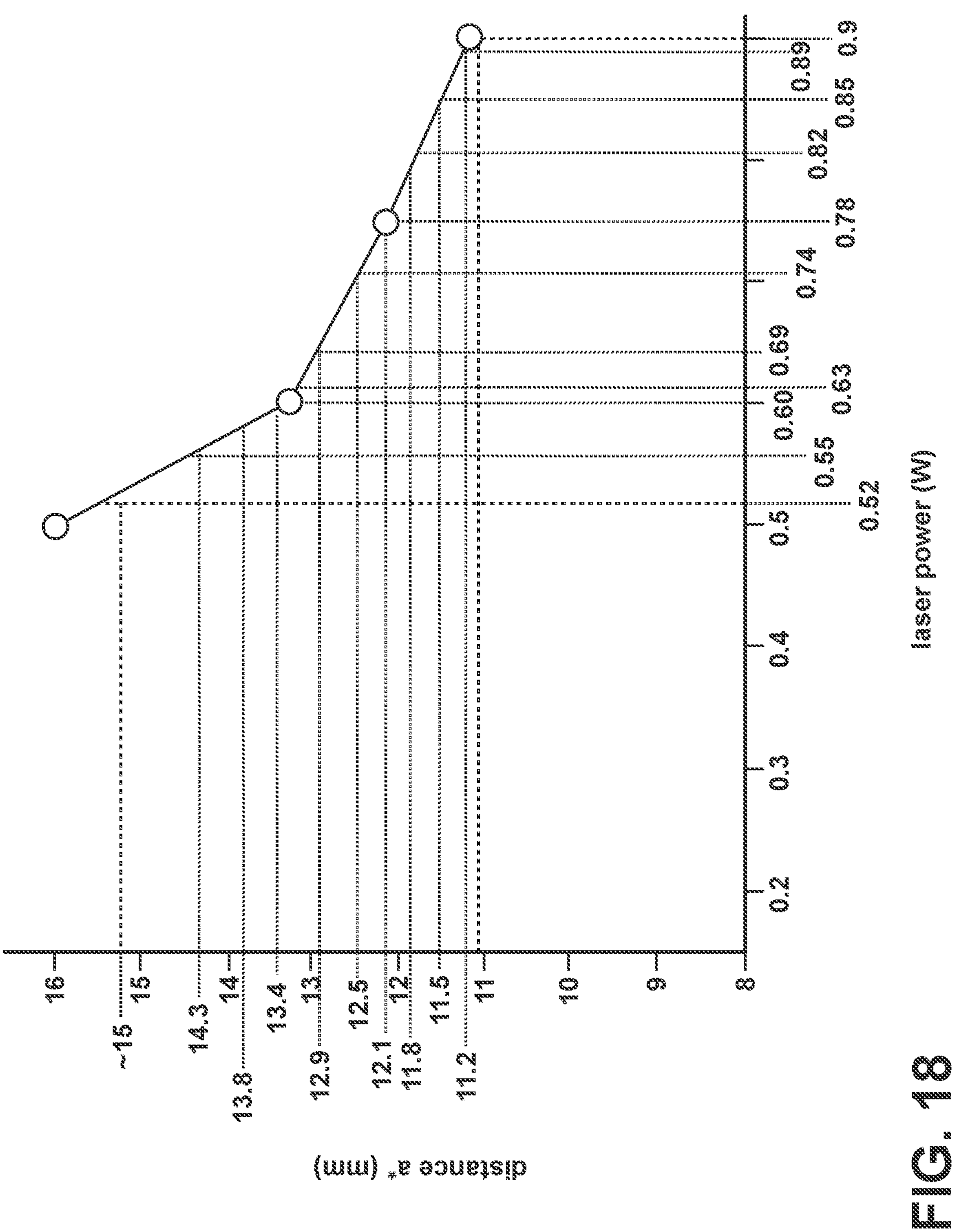
FIG. 18 is a magnified portion of the graph of FIG. 13, illustrating the incident laser energy density (here, specifically, laser powers in Watts at a constant laser speed and spot size) to be used to form each of the bonds of the device of FIG. 1 as a function of the distance values obtained from FIG. 17.

Pursuant to step 66 of the method 34, the laser power to be used in forming each intermediate bond 26 between the innermost bond 26*a* and the outermost bond 26*b* as a function of the determined distance 46 (a*) for each bond 26 was determined from the graph at FIG. 18, which is a magnified relevant portion from FIG. 13, and plots distance 46 (a*) as a function of laser power. The distances 46 (a*) for each intermediate bond 26 that was determined above was tracked horizontally to the laser power as a function of distance (a*) line and then the vertical line to the laser power axis was drawn to determine the laser power to be used to form each of the intermediate bonds 26 between the innermost bond 26*a* and the outermost bond 26*b*.

| Bond | Radius (mm) | $K_{IC}$ (MPa · m½) | a* (mm) | Power (W) |
|---|---|---|---|---|
| 1 (innermost) | 0.75 | 0.31 | 15.0 | 0.52 |
| 2 | ~0.78 | 0.33 | 14.3 | 0.55 |
| 3 | ~0.81 | 0.36 | 13.8 | 0.60 |
| 4 | ~0.84 | 0.38 | 13.4 | 0.63 |
| 5 | ~0.87 | 0.40 | 12.9 | 0.69 |
| 6 | ~0.90 | 0.43 | 12.5 | 0.74 |
| 7 | ~0.92 | 0.45 | 12.1 | 0.78 |
| 8 | ~0.95 | 0.47 | 11.8 | 0.82 |
| 9 | ~0.98 | 0.49 | 11.5 | 0.85 |
| 10 | ~1.01 | 0.52 | 11.2 | 0.89 |
| 11 (outermost) | 1.04 | 0.55 | 11.0 | 0.90 |

Finally, pursuant to step 68 of the method 34, the laser was used to form the bonds 26 between the first substrate 12 and the second substrate 16, each bond 26 being formed with the determined laser power. The laser power was sequentially increased for each bond 26 moving outward from the innermost bond 26*a*, at a constant laser speed and spot size. The liquid 22 can be deposited in the cavity, and the third substrate 14 can be bonded to the second substrate 16 before or after bonding the first substrate 12 to the second substrate 16.

It will be apparent to those skilled in the art that various modifications and variations can be made without departing from the spirit or scope of the claims.

What is claimed is:

1. A device comprising:

a first substrate;

a second substrate bonded to the first substrate via a plurality of concentric fusion bonds comprising an innermost bond, an outermost bond, and at least one intermediate bond between the innermost bond and the outermost bond, the at least one intermediate bond spaced radially apart from the innermost bond and the outermost bond; and wherein strengths of the concentric fusion bonds increase sequentially from the innermost bond to the outermost bond.

2. The device of claim 1, wherein:

each bond of the plurality of concentric fusion bonds comprises a different effective fracture toughness ($K_{IC}$);

the innermost bond comprises the smallest effective fracture toughness ($K_{IC}$);

the outermost bond comprises the largest effective fracture toughness ($K_{IC}$); and the effective fracture toughness ($K_{IC}$) of each bond of the at least one intermediate bond increases toward the outermost bond.

3. The device of claim 1, further comprising:

a third substrate bonded to the second substrate opposite the first substrate;

a cavity defined by the first substrate, the third substrate, and a through-hole of the second substrate;

a fluid disposed within the cavity; and wherein the strength of each bond of the plurality of concentric fusion bonds is sufficiently low that the plurality of concentric fusion bonds fail, instead of the first substrate, in response to the fluid exerting pressure on the first substrate.

4. The device of claim 1, further comprising:

a third substrate bonded to the second substrate opposite the first substrate;

a cavity defined by the first substrate, the third substrate, and a through-hole of the second substrate;

a fluid disposed within the cavity; and wherein each bond of the plurality of concentric bonds is configured to fail at approximately a same pressure exerted on the first substrate by the fluid.

5. The device of claim 1, wherein:

each bond of the plurality of bonds comprises a radius; and the radii and the strengths of the plurality of concentric fusion bonds are cooperatively configured such that each bond of the plurality of concentric fusion bonds fails at approximately a same pressure exerted by the fluid.

6. The device of claim 1, wherein each of the first substrate and the second substrate comprises a coefficient of thermal expansion greater than 5 ppm/° C. from 20° C. to 300° C.

7. The device of claim 1, wherein:

each bond of the plurality of concentric fusion bonds comprises a width, and the widths of the plurality of concentric fusion bonds are at least approximately equal;

adjacent bonds are separated by a spacing, and the spacings between all adjacent bonds are at least approximately equal; and a ratio of the spacing to the width is 1 to 5.

* * * * *